US011075013B2

(12) United States Patent
Abbott et al.

(10) Patent No.: US 11,075,013 B2
(45) Date of Patent: Jul. 27, 2021

(54) REMOVING HEAT FROM A NUCLEAR REACTOR BY HAVING MOLTEN FUEL PASS THROUGH PLURAL HEAT EXCHANGERS BEFORE RETURNING TO CORE

(71) Applicant: TerraPower, LLC, Bellevue, WA (US)

(72) Inventors: Ryan Abbott, Mountain View, CA (US); Anselmo T. Cisneros, Jr., Seattle, WA (US); Mark R. Werner, Bellevue, WA (US)

(73) Assignee: TerraPower, LLC, Bellevue, WA (US)

( * ) Notice: Subject to any disclaimer, the term of this patent is extended or adjusted under 35 U.S.C. 154(b) by 0 days.

(21) Appl. No.: 16/690,694

(22) Filed: Nov. 21, 2019

(65) Prior Publication Data

US 2020/0185114 A1 Jun. 11, 2020

Related U.S. Application Data

(63) Continuation of application No. 15/631,741, filed on Jun. 23, 2017, now Pat. No. 10,497,479.

(60) Provisional application No. 62/363,117, filed on Jul. 15, 2016.

(51) Int. Cl.
| | | |
|---|---|---|
| *G21C 1/32* | (2006.01) | |
| *G21C 3/54* | (2006.01) | |
| *G21C 5/12* | (2006.01) | |
| *G21C 1/04* | (2006.01) | |
| *G21C 3/04* | (2006.01) | |
| *G21C 5/10* | (2006.01) | |
| *G21C 5/16* | (2006.01) | |

(Continued)

(52) U.S. Cl.
CPC ............... *G21C 1/322* (2013.01); *G21C 3/54* (2013.01); *G21C 5/12* (2013.01); *G21C 1/04* (2013.01); *G21C 1/22* (2013.01); *G21C 3/04* (2013.01); *G21C 5/10* (2013.01); *G21C 5/16* (2013.01); *G21C 11/08* (2013.01); *Y02E 30/30* (2013.01)

(58) Field of Classification Search
CPC . G21C 1/322; G21C 3/54; G21C 5/12; G21C 11/08; G21C 3/04; G21C 5/10; G21C 5/16; G21C 1/04; G21C 11/06
USPC .................................................. 376/360, 406
See application file for complete search history.

(56) References Cited

U.S. PATENT DOCUMENTS

| | | |
|---|---|---|
| 2,375,009 A | 5/1945 | Lepsoe |
| 2,874,106 A | 2/1959 | Hammond et al. |
| 2,920,024 A | 1/1960 | Barton et al. |

(Continued)

FOREIGN PATENT DOCUMENTS

| | | |
|---|---|---|
| CA | 631890 A | 11/1961 |
| DE | 1112791 | 8/1961 |

(Continued)

OTHER PUBLICATIONS

PCT International Preliminary Report on Patentability in International Application PCT/US2019/015967, dated Aug. 13, 2020, 16 pages.

(Continued)

*Primary Examiner* — Jack W Keith
*Assistant Examiner* — Daniel Wasil

(57) ABSTRACT

This disclosure describes various configurations and components of a molten fuel fast or thermal nuclear reactor in which one or more primary heat exchangers are located above the reactor core of the nuclear reactor.

7 Claims, 21 Drawing Sheets

(51) Int. Cl.
G21C 11/08 (2006.01)
G21C 1/22 (2006.01)

(56) References Cited

U.S. PATENT DOCUMENTS

| | | | |
|---|---|---|---|
| 2,945,794 A | 7/1960 | Winters et al. | |
| 3,018,239 A | 1/1962 | Happell | |
| 3,029,130 A | 4/1962 | Moore | |
| 3,046,212 A | 7/1962 | Anderson | |
| 3,136,700 A | 6/1964 | Poppendiek et al. | |
| 3,216,901 A | 11/1965 | Teitel | |
| 3,218,160 A | 11/1965 | Knighton et al. | |
| 3,262,856 A | 7/1966 | Bettis | |
| 3,287,225 A | 11/1966 | Ackroyd et al. | |
| 3,383,285 A | 5/1968 | Ackroyd et al. | |
| 3,450,198 A | 6/1969 | Brunner | |
| 3,785,924 A | 1/1974 | Notari | |
| 3,909,351 A | 9/1975 | Tilliette | |
| 3,996,099 A | 12/1976 | Faugeras | |
| 3,997,413 A | 12/1976 | Fougner | |
| 4,039,377 A | 8/1977 | Andrieu | |
| 4,045,286 A | 8/1977 | Blum | |
| 4,056,435 A | 11/1977 | Carlier | |
| 4,216,821 A | 8/1980 | Robin | |
| 4,342,721 A | 8/1982 | Pomie | |
| 4,397,778 A | 8/1983 | Lloyd | |
| 4,762,667 A | 8/1988 | Sharbaugh | |
| 5,185,120 A | 2/1993 | Fennern | |
| 5,196,159 A | 3/1993 | Kawashima | |
| 5,223,210 A | 6/1993 | Hunsbedt | |
| 5,380,406 A | 1/1995 | Horton | |
| 5,421,855 A | 6/1995 | Hayden | |
| 6,181,759 B1 | 1/2001 | Heibel | |
| 7,217,402 B1 | 5/2007 | Miller | |
| 8,416,908 B2 | 4/2013 | Mann | |
| 8,594,268 B2 | 11/2013 | Shu | |
| 8,734,738 B1 | 5/2014 | Herrmann | |
| 9,171,646 B2 | 10/2015 | Moses et al. | |
| 10,043,594 B2 | 8/2018 | Scott | |
| 10,438,705 B2 | 10/2019 | Cheatham | |
| 10,497,479 B2 | 12/2019 | Abbott et al. | |
| 10,734,122 B2 | 8/2020 | Cisneros et al. | |
| 10,867,710 B2 | 12/2020 | Cisneros | |
| 2004/0114703 A1 | 6/2004 | Bolton | |
| 2005/0220251 A1 | 10/2005 | Yokoyama | |
| 2008/0310575 A1 | 12/2008 | Cinotti | |
| 2011/0222642 A1 | 9/2011 | Gautier | |
| 2011/0286563 A1 | 11/2011 | Moses | |
| 2012/0051481 A1 | 3/2012 | Shu | |
| 2012/0056125 A1 | 3/2012 | Raade | |
| 2012/0183112 A1 | 7/2012 | Leblanc | |
| 2012/0288048 A1 | 11/2012 | Mann | |
| 2012/0314829 A1 | 12/2012 | Greene | |
| 2013/0083878 A1 | 4/2013 | Massie | |
| 2013/0180520 A1 | 7/2013 | Raade | |
| 2013/0272470 A1 | 10/2013 | Whitten et al. | |
| 2014/0166924 A1 | 6/2014 | Raade | |
| 2014/0348287 A1 | 11/2014 | Huke et al. | |
| 2015/0010875 A1 | 1/2015 | Raade | |
| 2015/0117589 A1 | 1/2015 | Kamei | |
| 2015/0036779 A1 | 2/2015 | Leblanc | |
| 2015/0078504 A1* | 3/2015 | Woolley | G21C 1/14 376/182 |
| 2015/0170766 A1 | 6/2015 | Singh et al. | |
| 2015/0228363 A1 | 8/2015 | Dewan et al. | |
| 2015/0243376 A1 | 8/2015 | Wilson | |
| 2015/0357056 A1 | 12/2015 | Shayer | |
| 2016/0005497 A1 | 1/2016 | Scott | |
| 2016/0189806 A1 | 6/2016 | Cheatham, III et al. | |
| 2016/0189812 A1 | 6/2016 | Czerwinski | |
| 2016/0189813 A1 | 6/2016 | Cisneros | |
| 2016/0196885 A1 | 7/2016 | Singh | |
| 2016/0217874 A1 | 7/2016 | Dewan | |
| 2016/0260505 A1 | 9/2016 | Cadell et al. | |
| 2016/0260509 A1 | 9/2016 | Kim et al. | |
| 2017/0084355 A1 | 3/2017 | Scott | |
| 2017/0092381 A1 | 3/2017 | Cisneros | |
| 2017/0117065 A1 | 4/2017 | Scott | |
| 2017/0213610 A1 | 7/2017 | Sumita et al. | |
| 2017/0301413 A1 | 10/2017 | Cisneros | |
| 2017/0301421 A1 | 10/2017 | Abbott | |
| 2017/0316840 A1 | 11/2017 | Abbott | |
| 2017/0316841 A1 | 11/2017 | Abbott et al. | |
| 2018/0019025 A1 | 1/2018 | Abbott et al. | |
| 2018/0047467 A1 | 2/2018 | Czerwinski | |
| 2018/0068750 A1 | 3/2018 | Cisneros | |
| 2018/0137944 A1 | 5/2018 | Abbott | |
| 2018/0277260 A1 | 9/2018 | Marcille et al. | |
| 2019/0237205 A1 | 8/2019 | Abbott | |
| 2019/0311816 A1 | 10/2019 | Sumita et al. | |
| 2020/0027590 A1 | 1/2020 | Cisneros | |
| 2020/0118698 A1 | 4/2020 | Cheatham | |
| 2020/0122109 A1 | 4/2020 | Kruizenga | |
| 2020/0185114 A1 | 6/2020 | Abbott et al. | |
| 2020/0211724 A1 | 7/2020 | Cisneros | |

FOREIGN PATENT DOCUMENTS

| | | |
|---|---|---|
| DE | 1439107 | 2/1969 |
| EP | 0617430 | 9/1994 |
| FR | 2296248 | 7/1976 |
| GB | 739968 | 11/1955 |
| GB | 835266 | 5/1960 |
| GB | 964841 | 7/1964 |
| GB | 2073938 | 10/1981 |
| GB | 2508537 | 12/2014 |
| JP | S57 1991 | 1/1982 |
| JP | 1991282397 | 12/1991 |
| JP | 2001-133572 | 5/2001 |
| JP | 2014-119429 | 6/2014 |
| JP | 2014534413 | 12/2014 |
| JP | 2015510588 | 4/2015 |
| RU | 57040 U1 | 9/2006 |
| RU | 2424587 C1 | 7/2011 |
| WO | WO 2013/116942 | 8/2013 |
| WO | WO 2014/0128457 | 8/2014 |
| WO | 014/196338 | 12/2014 |
| WO | WO 2013/180029 | 5/2015 |
| WO | WO 2014/074930 | 5/2015 |
| WO | WO 2015/140495 | 9/2015 |
| WO | WO 2016/109565 | 7/2016 |
| WO | WO 2018013317 | 1/2018 |

OTHER PUBLICATIONS

Clarno, K.T. et al., "Trade studies for the liquid-salt-cooled very high-temperature reactor fiscal year 2006 progress report", ORNL/TM-2006 140 (2007), 35 pgs.

Kimura, "Neutron spectrum in small iron pile surrounded by lead reflector", Journal of Nucear Science and Technology 15, No. 3 (1978): 183-191.

PCT International Search Report and Written Opinion in International Application PCT/US2019/051345, dated Mar. 5, 2020, 15 pages.

Wang, Jun-Wei et al., "Influence of MgC12content on corrosion behavior of GH1140 in molten naCl—MgC12as thermal storage medium", Solar Energy Materials and Solar Cells, Elsevier Science Pub., Amsterdam, NL, vol. 179, Nov. 20, 2017, pp. 194-201.

PCT International Preliminary Report on Patentability in International Application PCT/US2019/021791, dated Sep. 24, 2020, 9 pages.

PCT International Search Report and Written Opinion in International Application PCT/US2017/038806, dated Oct. 16, 2017, 13 pgs.

PCT International Preliminary Report on Patentability in International Application PCT/US2017/038806, dated Jan. 15, 2019, 7 pgs.

Donnelly et al., Fabrication of Heat Exchanger Tube Bundle for the Molten-Salt Reactor Experiment, ORNL-3500, Dec. 9, 1963, 42 pgs.

(56) References Cited

OTHER PUBLICATIONS

Mourogov et al., Potentialities of the fast spectrum molten salt reactor concept: REBUS-3700, Energy Conversion and Management, Mar. 30, 2006, vol. 47, No. 17, pp. 2761-2771.
PCT International Preliminary Report on Patentability in International Application PCT/US2017/030455, dated Nov. 6, 2018, 17 pages.
PCT International Preliminary Report on Patentability in International Application PCT/US2017/030457, dated Nov. 15, 2018, 15 pages.
PCT International Search Report and Written Opinion in International Application PCT/US2017/030455, dated Jan. 30, 2018, 23 pages.
PCT International Search Report and Written Opinion in International Application PCT/US2017/030457, dated Jan. 23, 2018, 20 pages.
Andreades et al., Technical Description of the Mark 1 Pebble-Bed Fluoride-Salt-Cooled High-Temperature Reactor (PB-FHR) Power Plant, Department of Nuclear Engineering, University of California, Berkeley (Sep. 30, 2014), 153 pages.
ASTM International, Designation: B898-11, Standard Specification for Reactive and Refractory Metal Clad Plate (Sep. 2011), 15 pages.
Cohen et al., "Vanadium-Lined HT9 Cladding Tubes", Argonne National Lab ANL/ET/CP-80384, (Feb. 1994), 12 pgs.
European Extended Search Report for EP 15876187.4 dated Sep. 11, 2018, 10 pages.
Forsberg et al., Fluoride-Salt-Cooled High-Temperature Reactor (FHR) Commercial Basis and Commercialization Strategy, MIT Center for Advanced Nuclear Energy Systems, MIT-ANP-TR-153, Dec. 2014, 148 pgs.
Forsberg et al., Fluoride-Salt-Cooled High-Temperature Reactor (FHR) for Power and Process Heat, Final Project Report, MIT-ANP-TR-157, Dec. 2014, 62 pgs.
Forsberg et al., Fluoride-Salt-Cooled High-Temperature Reactor (FHR): Goals, Options, Ownership, Requirements, Design, Licensing, and Support Facilities, MIT Center for Advanced Nuclear Energy Systems, MIT-ANP-TR-154, Dec. 2014, 217 pgs.
Forsberg, Appendix D: Test Reactor Workshop Conclusions, NEUP Integrated Research Project Workshop 6: Fluoride Salt-Cooled High Temperature Reactor (FHR) Test Reactor Goals; Designs, and Strategies, Oct. 2-3, 2014, 11 pages.
Freeman et al., "Archimedes Plasma Mass Filter", AIP Cont. Proc. 694, 403 (2003), 9 pages.
GEN IV International Forum, Molten Salt Reactor (MSR), https://www.gen-4.org/gif/jcms/c_9359/msr, accessed Feb. 26, 2016, 3 pgs.
Grimes, W.R., "Molten-Salt Reactor Chemistry" Nucl. Appl. Technol. 8(137) (1970), 19 pgs.
Harder, B.R., Long, G., and Stanaway, W.P., "Compatibility and Processing Problems in the Use of Molten Uranium Chloride-Alkali Chloride Mixtures as Reactor Fuels," Symposium on Reprocessing of Nuclear Fuels, Iowa State University, 405-432, Aug. 1969.
Holcomb, et al. "Fast Spectrum Molten Salt Reactor Options", Jul. 2011, 46 pages. Available at: http://info.ornl.gov/sites/publications/files/Pub29596.pdf.
Kramer et al., Fusion-Fission Blanket Options for the LIFE Engine, Fusion Science and Technology, vol. 60, pp. 72-77, Jul. 2011.
Kramer et al., Parameter study of the LIFE engine nuclear design, Energy Conversion and Management, 51, pp. 1744-1750, 2010.
Merle-Lucotte, E., Introduction to the Physics of the Molten Salt Fast Reactor, Thorium Energy Conference 2013 (ThEC13), 2013, 82 pgs.
Molten Salt Reactor (MSR) Review: Feasibility Study of developing a pilot scale molten salt reactor in the UK, Jul. 2015, Energy Process Development, LTD., www.energyprocessdevelopments.com, 75 pgs.
MSR-FUJI General Information, Technical Features, and Operating Characteristics., pp. 1-30.

Ottewitte, E. H., "Configuration of a Molten Chloride Fast Reactor on a Thorium Fuel Cycle to Current Nuclear Fuel Cycle Concerns," Ph.D. dissertation, University of California at Los Angeles, 1982, 310 pgs.
Ottewitte, E. H., Cursory First Look at the Molten Chloride Fast Reactor as an Alternative to the Conventional BATR Concept, 1992, 75 pgs.
PCT International Preliminary Report on Patentability in International Application PCT/US2016/055001, dated Apr. 12, 2018, 9 pages.
PCT International Preliminary Report on Patentability in International Application PCT/US2017/030666 dated Nov. 6, 2018, 9 pages.
PCT International Search Report and Written Opinion in International Application No. PCT/US2017/030672, dated Sep. 27, 2017, 9 pages.
PCT International Search Report and Written Opinion in International Application PCT/US2015/067905 dated Aug. 5, 2016, 18 pages.
PCT International Search Report and Written Opinion in International Application PCT/US2015/067923, dated Apr. 19, 2016, 10 pages.
PCT International Search Report and Written Opinion in International Application PCT/US2016/055001, dated Jan. 25, 2017, 11 pages.
PCT International Search Report and Written Opinion in International Application PCT/US2017/030666 dated Jul. 20, 2017, 11 pages.
Reactor Start-up Procedure. Technical University Dresden. Reactor Training Course. pp. 3-4. <https://tu-dresden.de/ing/maschinenwesen/iet/wket/ressourcen/dateien/akr2/Lehrrnaterialien/start_e.pdf?lang=en>. (Mar. 2015), 21 pgs.
Scott, Ian and Durham John, The Simple Molten Salt Reactor, Practical, safe and cheap, Moltex Energy LLP presentation slides, 19 pgs.
Scott, Ian, Safer, cheaper nuclear: The simple molten salt reactor (Dec. 2, 2014), http://www.ee.co.za/article/safer-cheaper-nuclear-simple-molten-salt-reactor.hlml, 10 pgs.
Taube, et al., Molten Plutonium Chlorides Fast Breeder Reactor Cooled by Molten Uranium Chloride, Annals of Nuclear Science and Engineering, vol. 1, pp. 277-281., 1974.
Thoma, R. E., "Chemical Aspects of MSRE Operations," ORNL-4658, Dec. 1971, 151 pages.
TransAtomic Power Technical White Paper, Mar. 2014, V1 .0.1., (2014), http://www.transatomicpower.com/, 34 pgs.
Van't Eind, R.J.S., Simulation of a Fast Molten Salt Reactor, PSR-131-2011-009, Jul. 2011, 68 pages.
Xu et al., Thorium Energy R&D in China, THEO13, CERN, Oct. 28, 2013, 59 pgs.
Maltsev et al., "Redox potentials of uranium in molten eutectic mixture of lithium, potassium, and cesium chlorides", Russian Metallurgy, Maiknauka—Interperidica, RU, vol. 2016, No. 8, Dec. 2016, 2 pgs.
Kuznetsov et al., "Electrochemical Behavior and Some Thermodynamic Properties of UCl [sub 4] and UCl [sub 3] Dissolved in a LiCl—KCl Eutectic Melt", Journal of the Electrochemical Society, vol. 152, No. 4, Jan. 2005, 11 pgs.
PCT International Search Report and Written Opinion in International Application PCT/US2017/046139, dated Jan. 17, 2018, 16 pages.
PCT International Preliminary Report on Patentability in International Application PCT/US2017/046139, dated Feb. 12, 2019, 8 pages.
PCT International Search Report and Written Opinion in International Application PCT/US2017/061843, dated Oct. 29, 2018, 23 pages.
PCT International Preliminary Report on Patentability in International Application PCT/US2017/061843, dated May 21, 2019, 13 pages.
PCT International Search Report and Written Opinion in International Application PCT/US2019/015967, dated Jun. 12, 2019, 25 pages.

(56) References Cited

OTHER PUBLICATIONS

PCT International Search Report and Written Opinion in International Application PCT/US2019/021791, dated Nov. 19, 2019, 15 pages.
European Extended Search Report for EP 15875826.8 dated Sep. 6, 2018, 7 pages.
PCT International Preliminary Report on Patentability in International Application PCT/US2015/067905, dated Jul. 4, 2017, 14 pages.
PCT International Preliminary Report on Patentability in International Application PCT/US2015/067923, dated Jul. 4, 2017, 7 pages.
PCT International Preliminary Report on Patentability in International Application PCT/US2017/030672, dated Nov. 6, 2018, 7 pages.
Abbott et al, Thermal and Mechanical Design Aspects of the LIFE Engine, Fusion Science and Technology Dec. 2008; 56(2), 7 pages.
Rouch et al, Preliminary thermal-hydraulic core design of the Molten Salt Fast Reactor (MSFR), Annals of Nuclear Energy 64 (2014) 449-456.
Yamaji et al., Experimental and numerical thermal-hydraulics investigation of a molten salt reactor concept core, Kerntechnik 82 (2017) 4.
Yamaji et al., Experimental investigation of the MSFR molten salt reactor concept, Kerntechnik 79 (2014) 5, pp. 408-416.
Yamaji et al., Experimental Modelling and Numerical Analysis of a Molten Salt Fast Reactor, Physor 2014—The Role of Reactor Physics Toward a Sustainable Future, Kyoto, Japan, Sep. 28-Oct. 2, 2014.
Yamaji et al., Thermal-hydraulic analyses and experimental modelling of MSFR, Annals of Nuclear Energy 64 (2014) 457-471.

\* cited by examiner

REMOVING HEAT FROM A NUCLEAR REACTOR BY HAVING MOLTEN FUEL PASS THROUGH PLURAL HEAT EXCHANGERS BEFORE RETURNING TO CORE

CROSS REFERENCE TO RELATED APPLICATIONS

This application is a continuation of U.S. patent application Ser. No. 15/631,741, filed Jun. 23, 2017, now U.S. Pat. No. 10,497,479, which application claims the benefit of U.S. Provisional Patent Application No. 62/363,117, titled "VERTICALLY-SEGMENTED NUCLEAR REACTOR", filed Jul. 15, 2016, which application is hereby incorporated by reference.

INTRODUCTION

The utilization of molten fuels in a nuclear reactor to produce power provides significant advantages as compared to solid fuels. For instance, molten fuel reactors generally provide higher power densities compared to solid fuel reactors, while at the same time having reduced fuel costs due to the relatively high cost of solid fuel fabrication.

Molten fluoride fuel salts suitable for use in nuclear reactors have been developed using uranium tetrafluoride ($UF_4$) mixed with other fluoride salts. Molten fluoride salt reactors have been operated at average temperatures between 600° C. and 860° C. Binary, ternary, and quaternary chloride fuel salts of uranium, as well as other fissionable elements, have been described in co-assigned U.S. patent application Ser. No. 14/981,512, titled MOLTEN NUCLEAR FUEL SALTS AND RELATED SYSTEMS AND METHODS, which application is hereby incorporated herein by reference. In addition to chloride fuel salts containing one or more of $UCl_4$, $UCl_3F$, $UCl_3$, $UCl_2F_2$, and $UClF_3$, the application further discloses fuel salts with modified amounts of $^{37}Cl$, bromide fuel salts such as $UBr_3$ or $UBr_4$, thorium chloride fuel salts, and methods and systems for using the fuel salts in a molten fuel reactor. Average operating temperatures of chloride salt reactors are anticipated between 300° C. and 800° C., but could be even higher, e.g., >1000° C.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

DETAILED DESCRIPTION

This disclosure describes various configurations and components of a molten fuel fast or thermal nuclear reactor. For the purposes of this application, embodiments of a molten fuel fast reactor that use a chloride fuel will be described. However, it will be understood that any type of fuel salt, now known or later developed, may be used and that the technologies described herein may be equally applicable regardless of the type of fuel used, such as, for example, salts having one or more of U, Pu, Th, or any other actinide. Note that the minimum and maximum operational temperatures of fuel within a reactor may vary depending on the fuel salt used in order to maintain the salt within the liquid phase throughout the reactor. Minimum temperatures may be as low as 300-350° C. and maximum temperatures may be as high as 1400° C. or higher.

Figure 1:
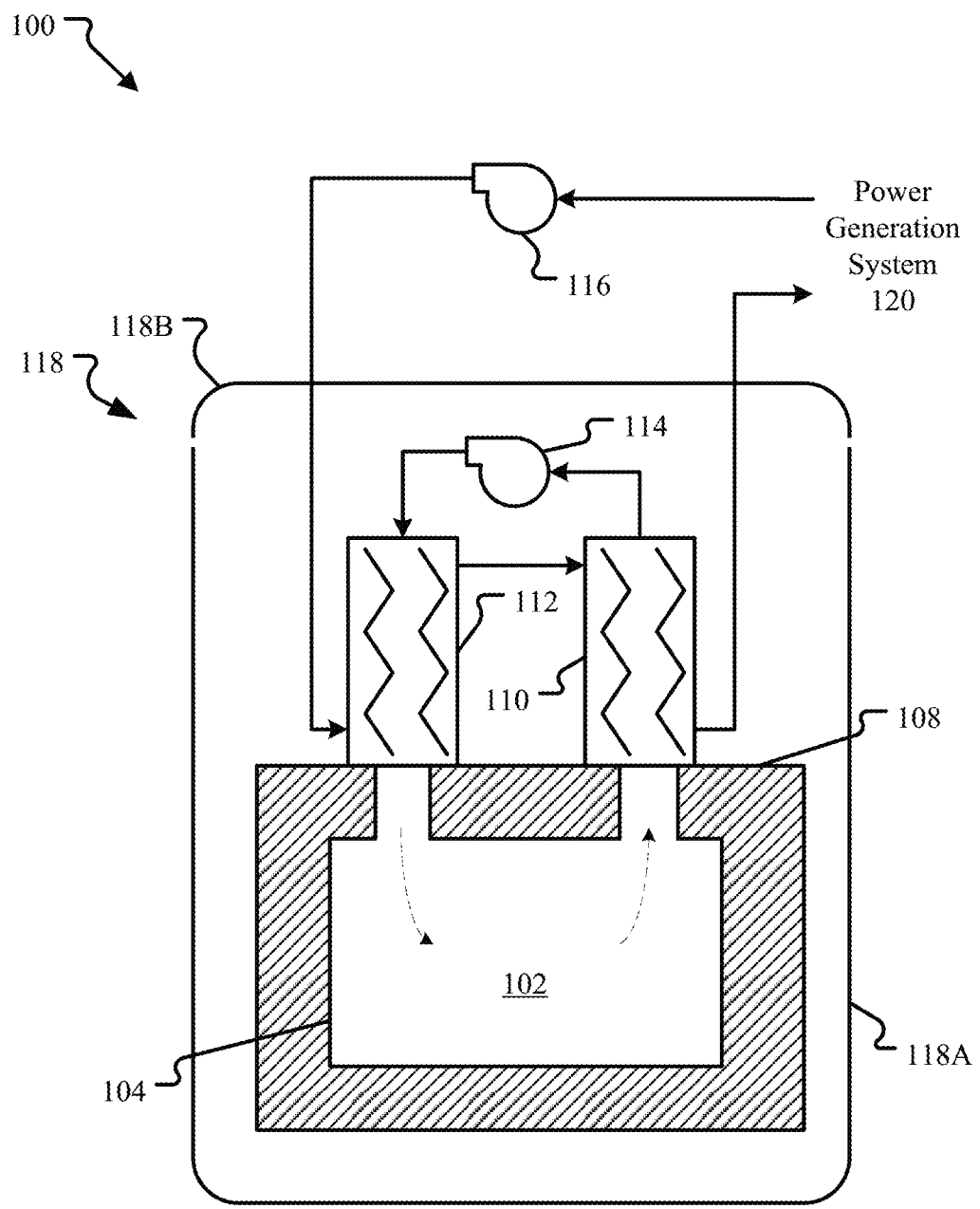
FIG. 1 illustrates, in a block diagram form, some of the basic components of a vertically-segmented molten fuel reactor.

FIG. 1 illustrates, in a block diagram form, a simplified rendering of the basic configuration of a vertically-segmented nuclear molten fuel reactor. In general, a vertically-segmented molten fuel reactor 100 includes a reactor core vessel 104 defining a reactor core 102 of a fissionable fuel salt that is liquid at the operating temperature. Fissionable fuel salts include salts of any nuclide capable of undergoing fission when exposed to low-energy thermal neutrons or high-energy neutrons. Furthermore, for the purposes of this disclosure, fissionable material includes any fissile material, any fertile material or combination of fissile and fertile materials. The size of the reactor core vessel 104 may be selected based on the characteristics and type of the particular fuel salt being used in order to achieve and maintain the fuel in an ongoing state of criticality, during which the heat generated by the ongoing fission events generates heat in the fuel causing the temperature of the molten fuel to rise when it is in the reactor core vessel 104.

In the vertically-segmented molten fuel reactor embodiments described in this application, a multi-stage heat exchanger is provided that includes at least one first heat exchanger stage 110 and at least one second heat exchanger stage 112 located above the reactor core vessel 104. The reactor core vessel 104, heat exchanger stages 110, 112, pump 114, molten fuel circulation equipment (including other ancillary components that are not shown such as piping, check valves, shutoff valves, flanges, drain tanks, ducts, flow directing baffles, etc.) and any other components through which the molten fuel salt circulates or contacts during operation can be referred to as the fuel circuit. In the fuel circuit, the hot fuel salt is circulated from the reactor core 102, up through the first heat exchanger stage 110, down through the second heat exchanger stage 112, and cooled fuel salt is returned into the core vessel 104. Fuel salt flow in the reactor core 102 is illustrated by the dashed arrows.

For simplicity, only one first heat exchanger stage 110 and only one second heat exchanger stage 112 are illustrated in FIG. 1. Alternative embodiments of the vertically-segmented reactor, as will be discussed in greater detail below, may use any number and/or configuration of heat exchangers for either the first or second heat exchanger stage 110, 112. Furthermore, except were explicitly discussed otherwise, heat exchangers will be generally presented in this disclosure in terms of simple, single pass, shell-and-tube heat exchangers having a set of tubes and with tube sheets at either end. However, it will be understood that, in general, any design of heat exchanger may be used, although some designs may be more suitable than others. For example, in addition to shell-and-tube heat exchangers, plate, plate and shell, printed circuit, and plate fin heat exchangers may be suitable. In addition, although described in terms of having the fuel salt on the tube side and the coolant flowed through the shell side of the exchanger, this could be reversed in an alternative embodiment.

For safety, all of the components of the fuel circuit are enclosed in a containment vessel 118. In an embodiment, the containment vessel 118 is a solid lower vessel portion 118A with no penetrations and a top portion 118B through which the reactor core and other components may be accessed. The lower vessel 118A completely surrounds the components of the fuel circuit such that a fuel salt leak from any component will be caught in the bottom of the containment vessel 118.

In the embodiment shown, the circulation may be driven using one or more pumps, such as fuel salt pump 114. While fuel salt pumps 114 may be located anywhere in the fuel circuit, in the embodiment shown the pump 114 is located above the heat exchangers 110, 112 to pump fuel salt from the outlet of the first heat exchanger stage 110 to inlet of the second heat exchanger stage 112.

In an alternative embodiment, the reactor core 104 and heat exchangers 110, 112 may be configured such that fuel circulation through the fuel circuit is driven by the density differential created by the temperature difference between the higher temperature fuel salt in the core 104 and the lower temperature salt elsewhere in the fuel circuit. This may be referred to as natural circulation. In many fuel salts, higher temperature molten salt is less dense than lower temperature salt. For example, in one fuel salt (71 mol % $UCl_4$-17 mol % $UCl_3$-12 mol % NaCl) for a 300° C. temperature rise (e.g., 627° C. to 927° C.), the fuel salt density was calculated to fall by 18%, from 3680 to 3010 kg/m$^3$. Such a configuration obviates the need for fuel salt pumps 114. However, relying solely on natural circulation may limit the amount of heat that can be removed and thus limits the total power output of the reactor 100.

The first and second heat exchanger stages 110, 112 transfer heat from the molten fuel salt to a primary coolant. In an embodiment the primary coolant may be another salt, such as NaCl—$MgCl_2$. Other coolants are also possible including Na, NaK, supercritical $CO_2$, lead, and lead bismuth eutectic. The primary coolant is circulated through a coolant circuit, such as by a pump 116. In an embodiment, the coolant may be maintained at a higher pressure so that any leakage in the fuel circuit will result in coolant entering the fuel circuit rather than fuel entering the coolant circuit. In the embodiment shown, primary coolant is circulated into the containment vessel 118 through the top portion 118B, through the first and second heat exchanger stages 110, 112, back out of the containment vessel 118, again, through the top portion 118B, and to a power generation system 120. The power generation system 120, as is known in the art, may be any type of system adapted to generate power from heated fluids.

The performance of the reactor 100 may be improved by using one or more reflectors 108 to reflect neutrons back into the center of the core vessel 104 to assist in maintaining criticality within the reactor core section 102 and/or the breeding of fissile fuels from fertile feed materials. By reducing such losses of neutrons, the amount of fuel salt necessary for criticality, and therefore, the size of the reactor core 102, may be reduced. The reflector 108 may be formed from any material known in the art suitable for neutron reflection. For example, materials with reflective properties may include, but are not limited to, one or more of zirconium, steel, iron, graphite, beryllium, tungsten carbide, lead, lead-bismuth and like materials. The reflector 108 may be a single component or any number of separate elements containing some amount of reflective material. As the efficiency of the reflector 108 is affected by the amount of reflective material in the path of neutrons leaving the core 102, the reflector 108 may be of any design or shape as long as the desired amount of reflective material is provided. However, the efficiency is also affected by the amount of absorbing material, such as structural elements in reflectors 108 used to contain the reflective material, so certain design trade-offs need to be managed when designing and placing reflectors in a reactor 100.

The reflector 108 may be outside of the core vessel 104 as shown, within the core vessel 104 (as further described below), or some combination of both. In the reactor embodiment shown, a reflector 108 separates the heat exchangers 110, 112 from the reactor core 104 with flow channels provided for the circulation of salt into and out of the core vessel 104. In a simple configuration, the reflector 108 may be a vessel containing a reflective material, such as lead, in which the reactor vessel 104 is located. In an alternative embodiment, the reflector 108 may include some number of reflector elements, such as tubes or containers filled with reflective material, spaced around the periphery of the reactor core vessel 104.

It is noted that at some operating temperatures of the nuclear reactor 100 of the present disclosure a variety of neutron reflecting materials will liquefy. For example, lead and lead-bismuth are both materials that provide good neutron reflecting characteristics. However, lead melts at approximately 327° C., while lead-bismuth alloys commonly have melting temperatures below 200° C. As noted elsewhere in this application, the reactor 100 may operate in a temperature range from approximately 330 to 800° C., above the melting points associated with lead and lead-bismuth alloys. The reflector 108 or separate reflector elements may be formed from any material known in the art and may be selected based on consideration of any one or more design functions including temperature resistance, corrosion resistance, non-reactivity with other components and/or the fuel, radiation resistance, required structural support, weight, etc. In some cases, one or more reflector elements may be formed out of a structural material that holds or contains (in the case of liquid reflective material) a reflective material. The structural material or materials used in a reflector 108 may be substantially neutronically translucent to the extent possible, at least on the side facing the reactor core. For example, a reflector 108 may be formed as a liner or vessel of one or more refractory alloys, nickel alloys, carbides, or graphite compounds. For instance, the material used to form the structural components of a reflector 108 may include, but are not limited to, any one or more components or combinations of one or more molybdenum alloys (e.g., TZM alloy), one or more tungsten alloys, one or more tantalum alloys, one or more niobium alloys, one or more rhenium alloys, one or more nickel alloys, silicon carbide, or graphite compounds, and the like.

In an alternative embodiment, a neutron shield (not shown in FIG. 1) may be provided to reduce the neutron exposure of the components outside of the reactor core vessel 104. For example, as discussed in greater detail with reference to FIG. 2, a shield may be provided between the reactor core 104 and the heat exchangers 110, 112 instead of, or in addition to, a reflector 108 between the reactor core 104 and the heat exchangers 110, 112. One effect of the shield is to reduce the neutron flux through the lower tube sheets and, more generally, to reduce the exposure of the components above the shield to neutrons emitted from the core. Depending on the design, a neutron shield may or may not also act as a reflector 108 or a neutron absorber.

FIG. 1 generally introduces the main components of the vertically-segmented reactor. Broadly speaking, the balance of this disclosure describes variations and alternative component configurations for the reactor 100.

Figure 2:
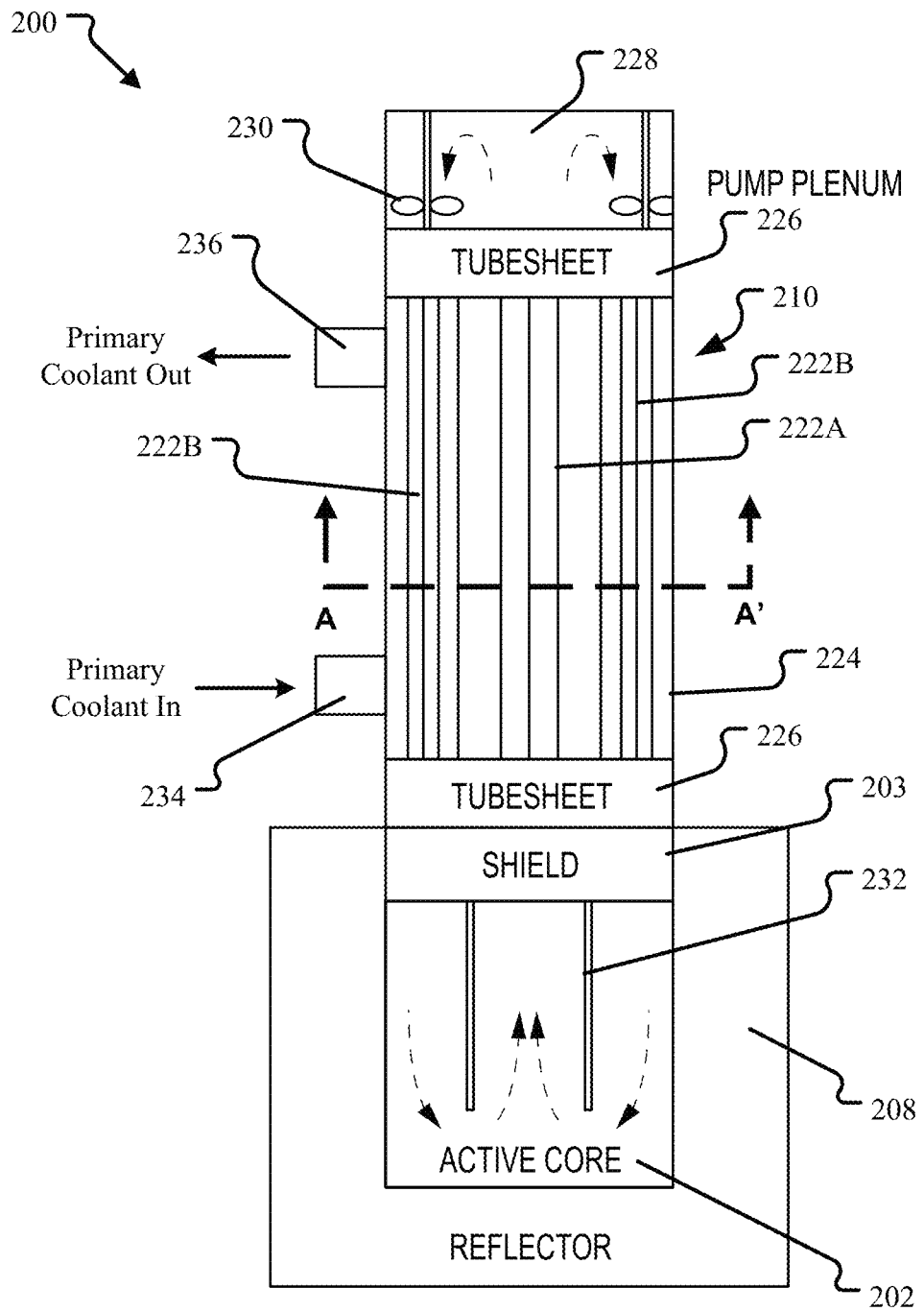
FIG. 2 illustrates a vertical cross-section of an alternative embodiment of a vertically-segmented nuclear reactor.

FIG. 2 illustrates a vertical cross-section of an alternative embodiment of a vertically-segmented reactor. In the reactor 200 shown, a cylindrical reactor core 202 is surrounded on the bottom and sides by reflector material 208. The reactor core is separated from the heat exchangers by a shield 203 at the top of the core 202. The shield 203 is provided with flow channels (not shown) through which the fuel salt can travel between the reactor core and the heat exchangers. In an embodiment, the flow channels are angled so that the neutron flux through the flow channels is reduced. For example, in an embodiment, the flow channels are curved, helically shaped or provided with one or more bends. In an alternative embodiment, a flow channel for the fuel salt that also reduces neutron flux through the flow channel may be created by filling the flow channel with a loose, random packing material, such as pellets, tubes, pebbles, saddles, spheres, or rings, of the shield material. In this embodiment, the flow channel essentially acts as a packed bed filter that allows the fuel salt to pass but that intercepts some or all of the neutrons passing through the flow channel. While these configurations increase the resistance to fluid flow, the neutron flux through the channels is reduced by eliminating any straight, unshielded path between the reactor core and the heat exchangers. One possible shield 203 could be a sheet or frame of structural steel upon which a layer of absorber material is connected. Examples of other materials suitable for use in a shield 203 include boron, boron carbide, and some rare earth elements.

Figure 3:
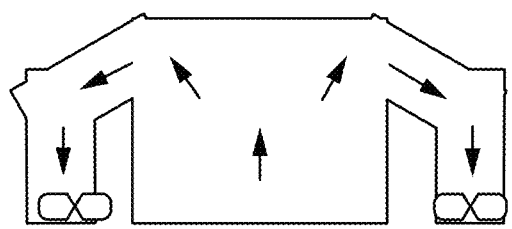
FIG. 3 illustrates one possible pump plenum configuration for the vertically-segmented nuclear reactor of FIG. 2.

In the reactor 200 shown, the first and second heat exchanger stages are provided as a single, integrated heat exchanger assembly 210. The integrated heat exchanger assembly 210 includes a plurality of vertically oriented tubes 222A, 222B within a single shell 224 and capped at both ends by a tube sheet 226. In the embodiment shown, fuel salt flows upward through the center tubes 222A of the integrated heat exchanger assembly 210, which perform the function of the first heat exchanger stage. The fuel salt exits the central tubes 222A into a pump plenum 228 located above the integrated heat exchanger assembly 210. Pump impellers 230 located in the plenum 228 circulate the fuel salt into the exterior tubes 222B of the integrated heat exchanger assembly 210 where it flows downward and back into the reactor core. To actively drive the flow through the components of fuel circuit, the reactor 200 may have multiple impellers 230 (as illustrated), a centrally located axial impeller that drives the fuel salt laterally to the periphery of the plenum, or a single, large "waterwheel" impeller 230 that rotates within the plenum about the center axis and drives flow down into the second heat exchanger stage's tubes. Fuel salt flow in the plenum 228 is illustrated by the dashed arrows. Baffles for flow control within the plenum 228 may be provided to assist in routing the coolant. In an alternative embodiment, instead of being an open space, some or all of the plenum 228 may be replaced by pipes, ducts, or channels formed in a solid element that acts as a manifold. For example, FIG. 3 illustrates one possible plenum 228 configuration.

In this configuration, the cooled fuel salt is delivered into the reactor core 202 from the exterior tubes 222B at the periphery of the core as shown. Baffles 232 are provided in the core to assist in directing the flow of the fuel salt through the reactor 200. Fuel salt flow in the reactor core is illustrated by the dashed arrows. Baffles 232 may be provided in any form or shape in order to achieve any desired flow profile, assist in mixing the fuel salt, or prevent flow dead spots within the core 202.

In the embodiment shown, primary coolant flows into the bottom of the shell 224 of the integrated heat exchanger assembly 210 through a coolant inlet 234 and exits the top of the shell via a coolant outlet 236. However, any number of coolant inlets and outlets 234, 236 at any location around the shell 224 may be used. Baffles for flow control and for separating regions within the shell 224 may be provided to control the exchange of heat between the fuel salt and the coolant.

The reactor 200 design is particularly suited for a circular horizontal cross-section. Any other desired horizontal cross-sectional shape may be used, such as ellipsoidal, hexagonal, rectangular, square, octagonal, triangular, etc. Individual non-circular horizontal cross-sections may not be as efficient as circular cross-sections in their production of power relative to the amount of fuel salt required, but may provide other advantages such as when packing multiple, independent reactors 200 together in a single containment vessel.

In yet another embodiment (not shown), the integrated heat exchanger assembly 210 may be replaced by heat exchanger tubes that flow through a "pool" of coolant. Primarily this embodiment differs from the integrated heat exchanger assembly 210 embodiment of FIG. 2 in that the outer shell 224 of the heat exchanger defines the bounds of a pool of coolant. Coolant may be injected into the pool and extracted from the pool at any one or more locations in the pool to obtain good heat transfer between the heat exchanger tubes and the coolant.

FIGS. 4A-D illustrate examples of some of the many possible horizontal cross-sections A-A of the integrated heat exchanger assembly 210 for the vertically-segmented reactor of FIG. 2. Note that in FIGS. 4A-D, the first heat exchanger stage 210A and the second heat exchanger stage 210B are defined by the flow in the tubes in those portions. Although a dashed line is provided for convenience to illustrate the general horizontal shape, in an embodiment the dashed line may or may not be a physical structure such as a baffle or internal shell. The first heat exchanger stage 210A is that area of the integrated heat exchanger assembly 210 that contains the tubes 222A through which hot fuel salt leaves the reactor core 202. These tubes 222A are illustrated with diagonal cross hatching. The second heat exchanger stage 210B is that portion through which the fuel salt flows through the tubes 222B downward before returning into the reactor core 202. The tubes 222B with downward flow being illustrated with a horizontal striped fill.

Figure 4A:
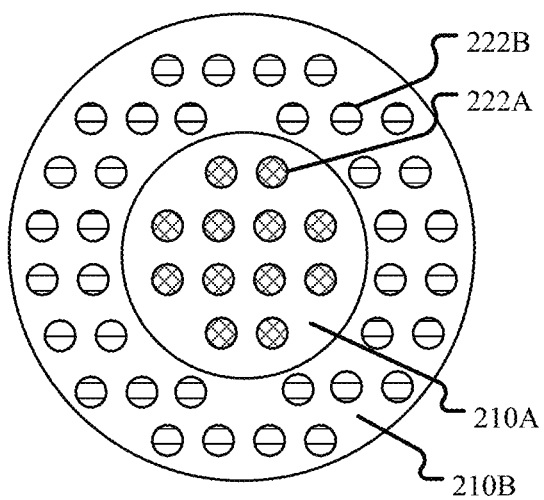
FIGS. 4A-D illustrate examples of some of the many possible horizontal cross-section embodiments for the vertically-segmented nuclear reactor of FIG. 2.

FIG. 4A illustrates a simple embodiment in which the cross-section of the first heat exchanger stage 210A is circular and the second heat exchanger stage 210B is an annulus centered on the first heat exchanger stage 210A.

Figure 4B:
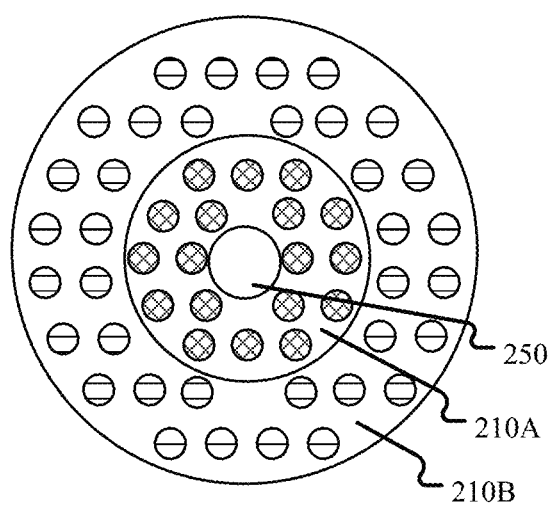

FIG. 4B illustrates another configuration in which the integrated heat exchanger assembly 210 is annular in shape centered on a central region 250. In this configuration, both the first heat exchanger stage 210A and the second heat exchanger stage 210B are annular in shape centered around the central region 250. In one embodiment, the central region 250 is not part of the heat exchanger 210. In this embodiment the central region 250 may be used to provide access to the reactor core 202 for instruments, control rods, and other ancillary equipment (not shown). In an alternative embodiment, some or the entire central region may be used for flowing primary coolant into or out of the first heat exchanger stage 210A.

Figure 4C:
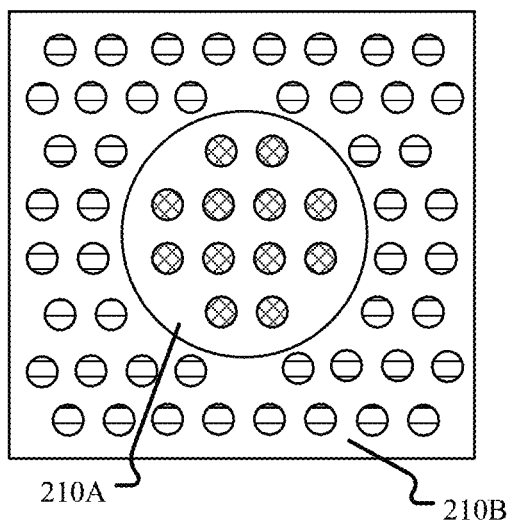

FIG. 4C is an embodiment in which the integrated heat exchanger assembly 210 is square in cross-section, but the first heat exchanger stage is circular. This illustrates that the first heat exchanger stage 210A and the second heat exchanger stage 210B need not be the same in cross-sectional shape, nor do they need to be centered or nested even though those embodiments are more commonly illustrated herein.

Figure 4D:
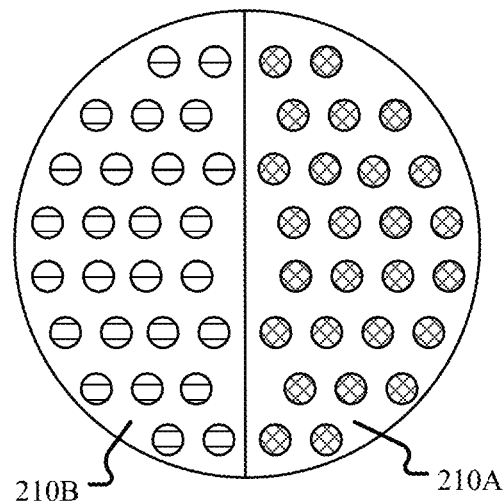

FIG. 4D illustrates yet another embodiment in which the integrated heat exchanger assembly 210 is circular in cross-section but separated into two semi-circular halves: one for the first heat exchanger stage 210A and one for the second heat exchanger stage 210B. In this embodiment, the lower tube sheet 226 and/or the shield may act as a manifold directing hot fuel salt into the first heat exchanger stage 210A from the center of the reactor core 202 and returning cooled fuel salt to the reactor core 202 from the downcomer tubes 222B at the periphery of the core 202 as shown in FIG. 2.

FIGS. 5A-D illustrate an alternative embodiment of a vertically-segmented reactor 500 utilizing a first heat exchanger stage 510 and eight, independent second heat exchanger stages 512. In the embodiment shown, the vertically-segmented molten fuel reactor 500 includes a reactor core vessel 504 defining a reactor core 502 of a fissionable fuel salt that is liquid at the operating temperature within a containment vessel 518A. The reactor core 502 is capped with a shield 503 and otherwise surrounded by reflector material 508.

A lone first heat exchanger stage 510 is provided. In the embodiment shown, the first heat exchanger stage 510 is a single pass, circular, shell-and-tube heat exchanger located above the central region of the reactor core 502. In the embodiment shown, the tubes of the first heat exchanger stage 510 penetrate the shield 503 to allow flow from the core 502.

Eight, independent second heat exchanger stages 512 are provided in a ring around the first heat exchanger stage 510. In the embodiment shown, each second heat exchanger stage 512 is a single pass, circular, shell-and-tube heat exchanger located above the central region of the reactor core 502.

At the top of the first heat exchanger stage 510 is a manifold 511 that distributes the fuel salt to each of eight, independent second heat exchanger stages 512. Eight U-shaped pipes 548 connect the manifold 511 to a pump plenum 528 above each of the eight second heat exchanger stages 512. An expansion tank 552 is located above the manifold 511 that protects the fuel circuit from over pressure conditions due the expansion of the fuel salt during operation. An impeller 530 is located in each of the pump plenums 528, each impeller 530 is provided with a shaft 531 that extends upwards that is driven by a motor or other equipment (not shown) above the level of the pump plenums 528. Such motors may be within the reactor 500, for example located near the top of the containment vessel cap 518B, or external to the reactor 500 with the shafts penetrating the containment vessel cap 518B.

Coolant flow is similar to that described with reference to FIG. 1. Cold coolant enters each of the second heat exchanger stages 512 at a cold coolant inlet 534 via a cold coolant delivery pipe 535 which comes in from the top of the containment vessel 518. The coolant is routed via interior baffles 538 through the second heat exchanger stages 512 to a second heat exchanger stages coolant outlet 536, which delivers the coolant directly to one of the eight first heat exchanger stage's coolant inlets 540. In the embodiment shown, coolant flows through the first heat exchanger stage 510, again routed by baffles to improve heat transfer, and exits the first heat exchanger stage 510 via one of the eight first heat exchanger stage coolant outlets 542, to be removed from the reactor 500 via hot coolant removal pipes 544.

Flow of fuel salt through the core 502 is again illustrated by the dashed arrows. Cooled fuel salt is returned at the periphery of the reactor core 502 and directed by a baffle 532 and also by a roughly conically-shaped contour 546 provided in the base of the reactor vessel 504.

Figure 5A:
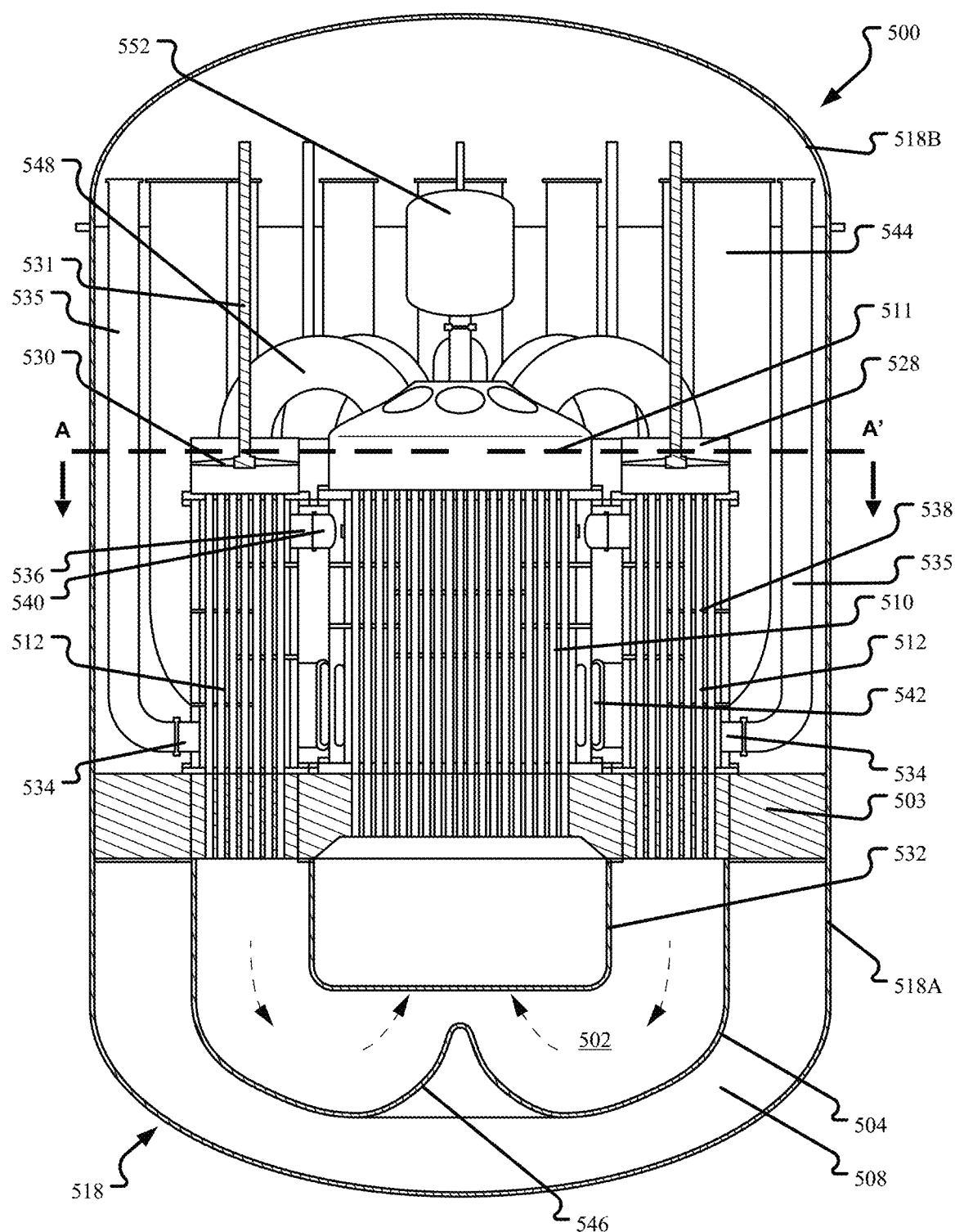
FIGS. 5A-D illustrate an alternative embodiment of a vertically-segmented nuclear reactor utilizing a single first heat exchanger stage and a plurality of independent second heat exchanger stages.
Figure 5B:
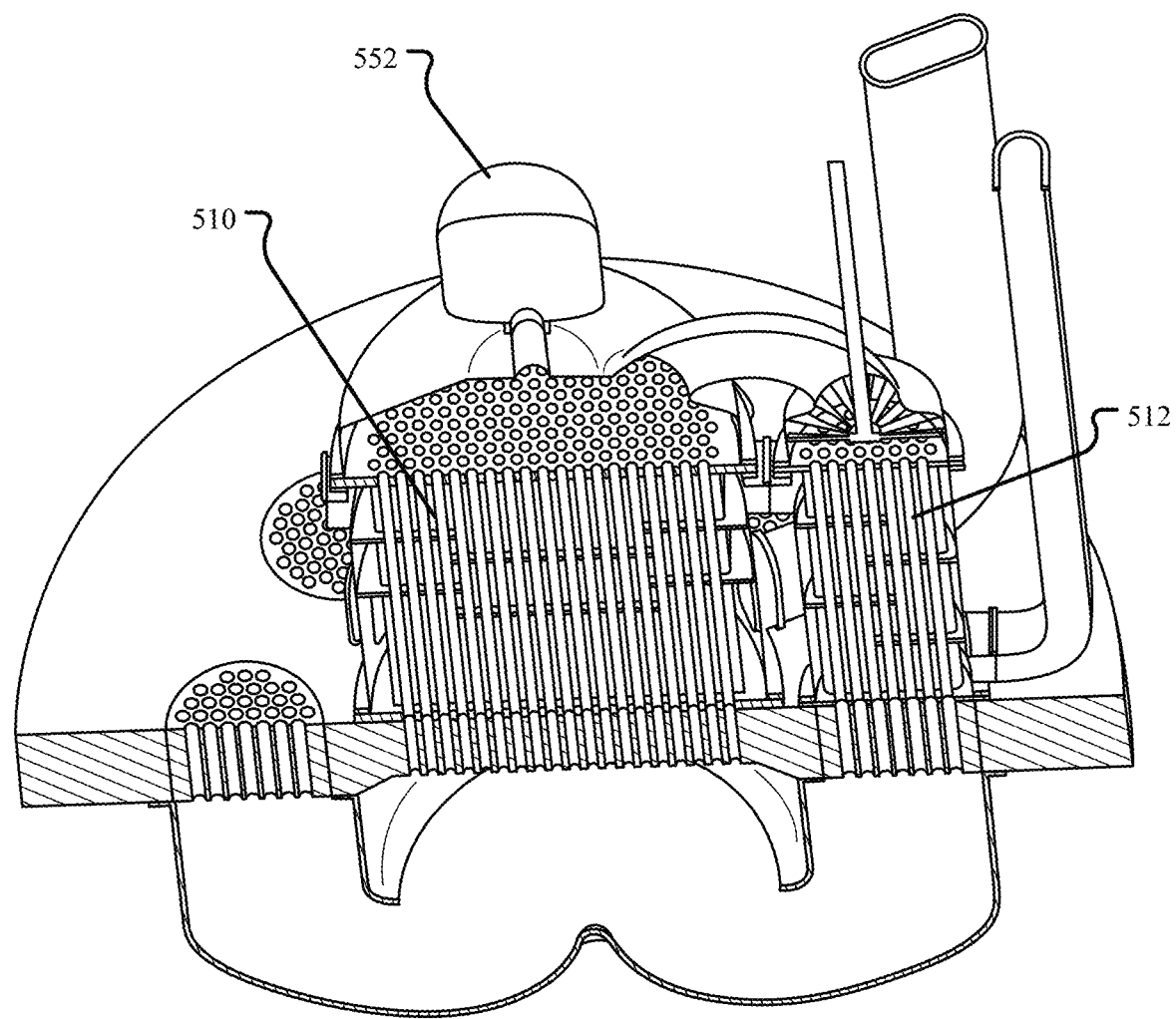

FIG. 5B is a perspective view of a cross-section of the reactor 500 showing more detail regarding the first and second heat exchanger stages 510 and 512 and their interconnections. In particular, FIG. 5B shows more detail regarding the expansion tank 552 connected to the manifold above the first heat exchanger stage 510.

Figure 5C:
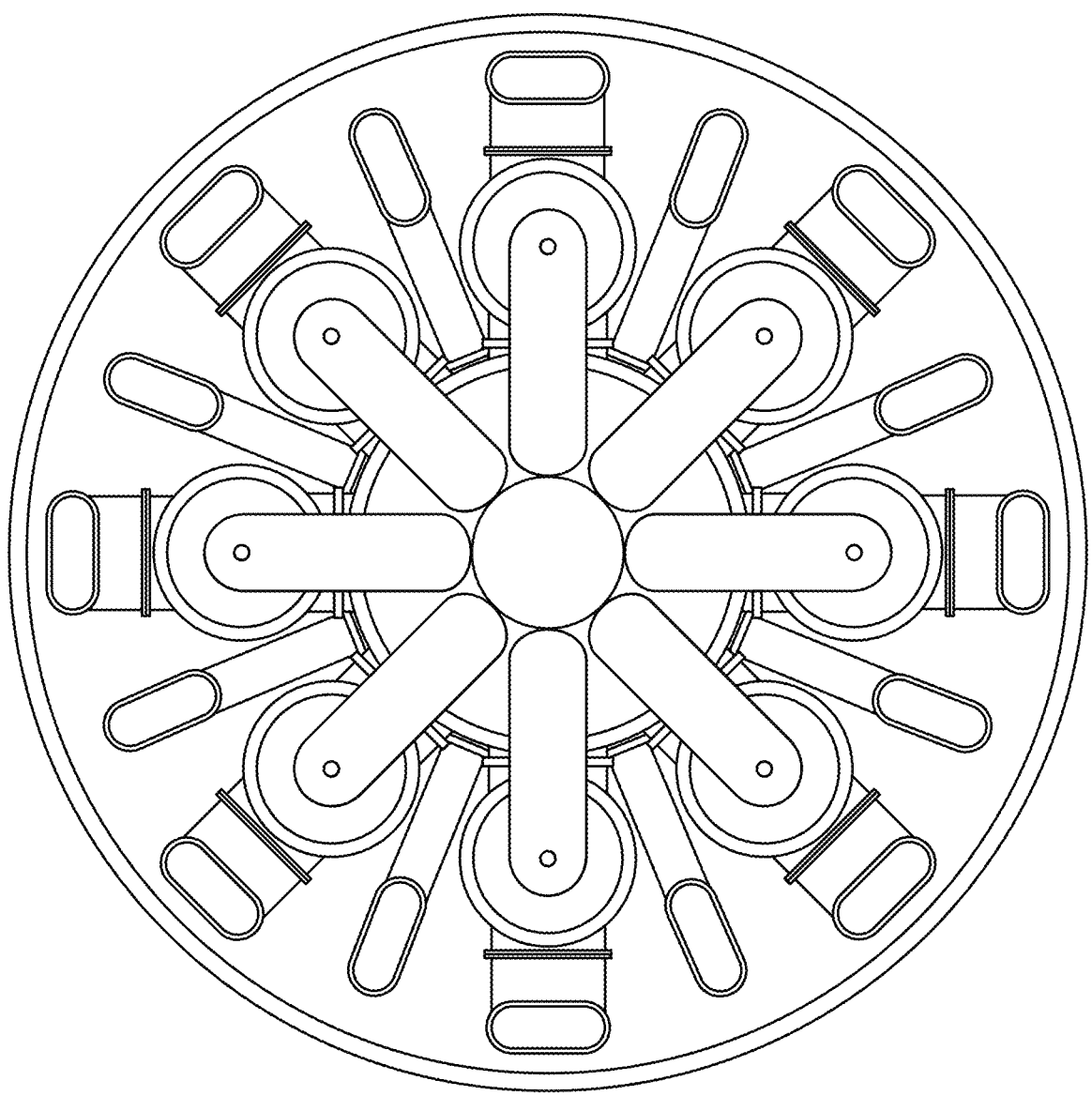

FIG. 5C is a plan view looking down on the reactor 500 with the containment vessel cap 518B removed.

Figure 5D:
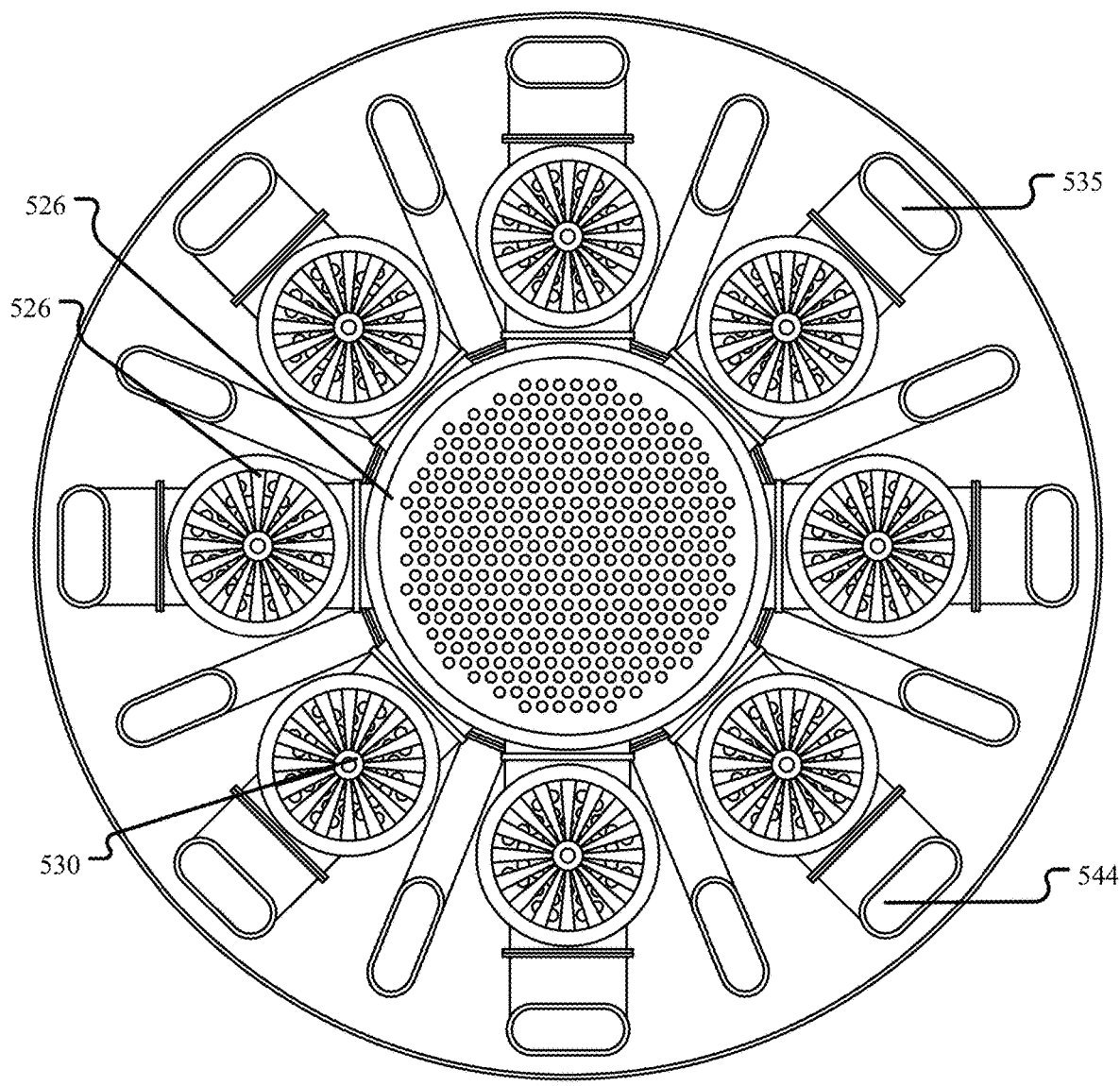

FIG. 5D is a horizontal cross-section along section A-A' of FIG. 5A showing further details of the upper tube sheets 526 of the heat exchangers (the upper tube sheets 526 of the second heat exchanger stages are partially obscured by the blades of the impellers 530) and locations of the impellers 530 and coolant piping 535, 544.

FIGS. 6A-D illustrate yet another embodiment of the vertically-segmented reactor. In the reactor 600 shown, four first heat exchanger stages 610 are provided above the central region of the reactor core 602. Each first heat exchanger stage 610 is connected to and forms a coolant circuit with one of the four second heat exchanger stages 612 and is connected to and delivers fuel salt to a different one of the four second heat exchanger stages 612. In other aspects, the reactor 600 is similar to that described with reference to FIG. 5.

Figure 6A:
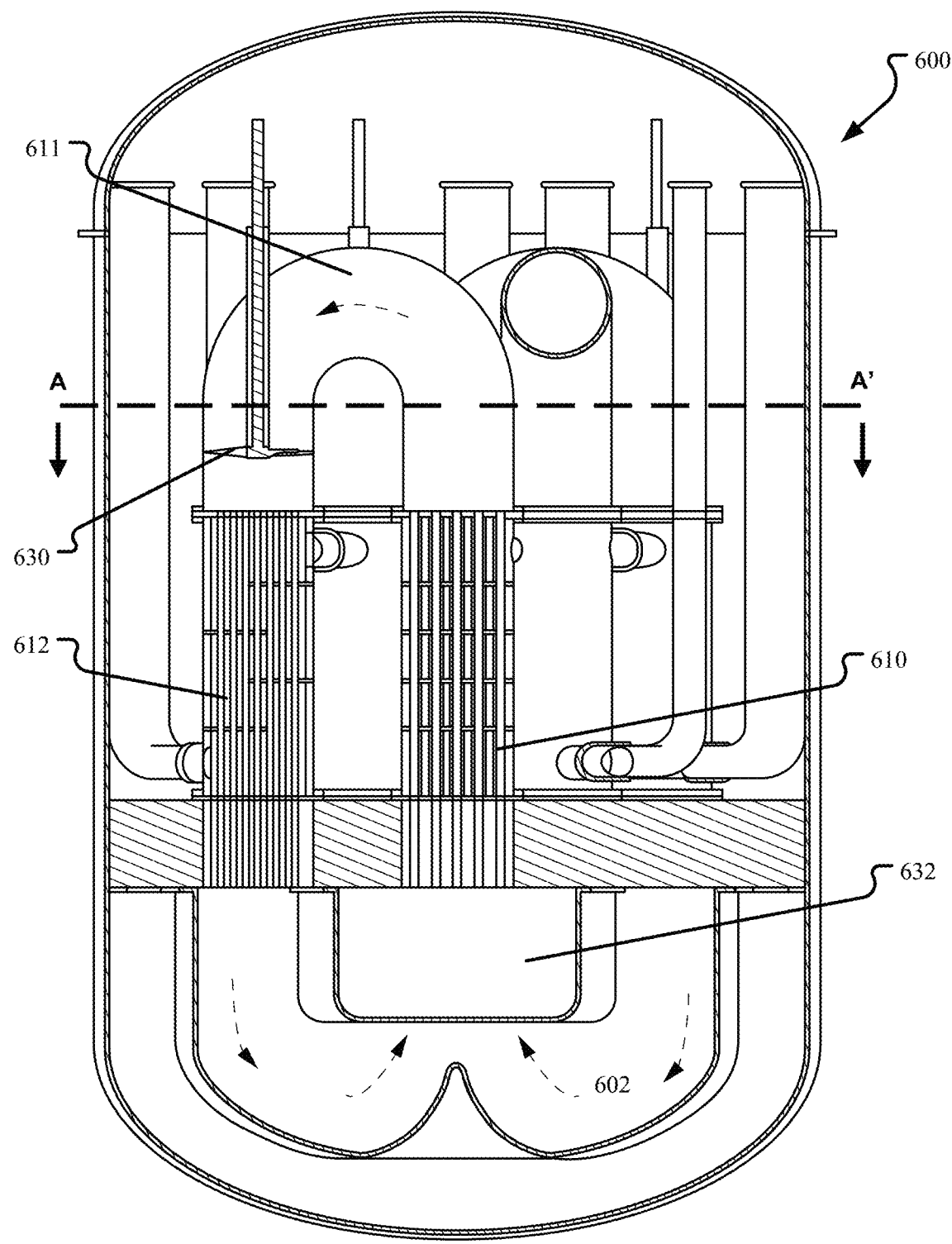
FIGS. 6A-D illustrate yet another embodiment of the vertically-segmented nuclear reactor.
Figure 6B:
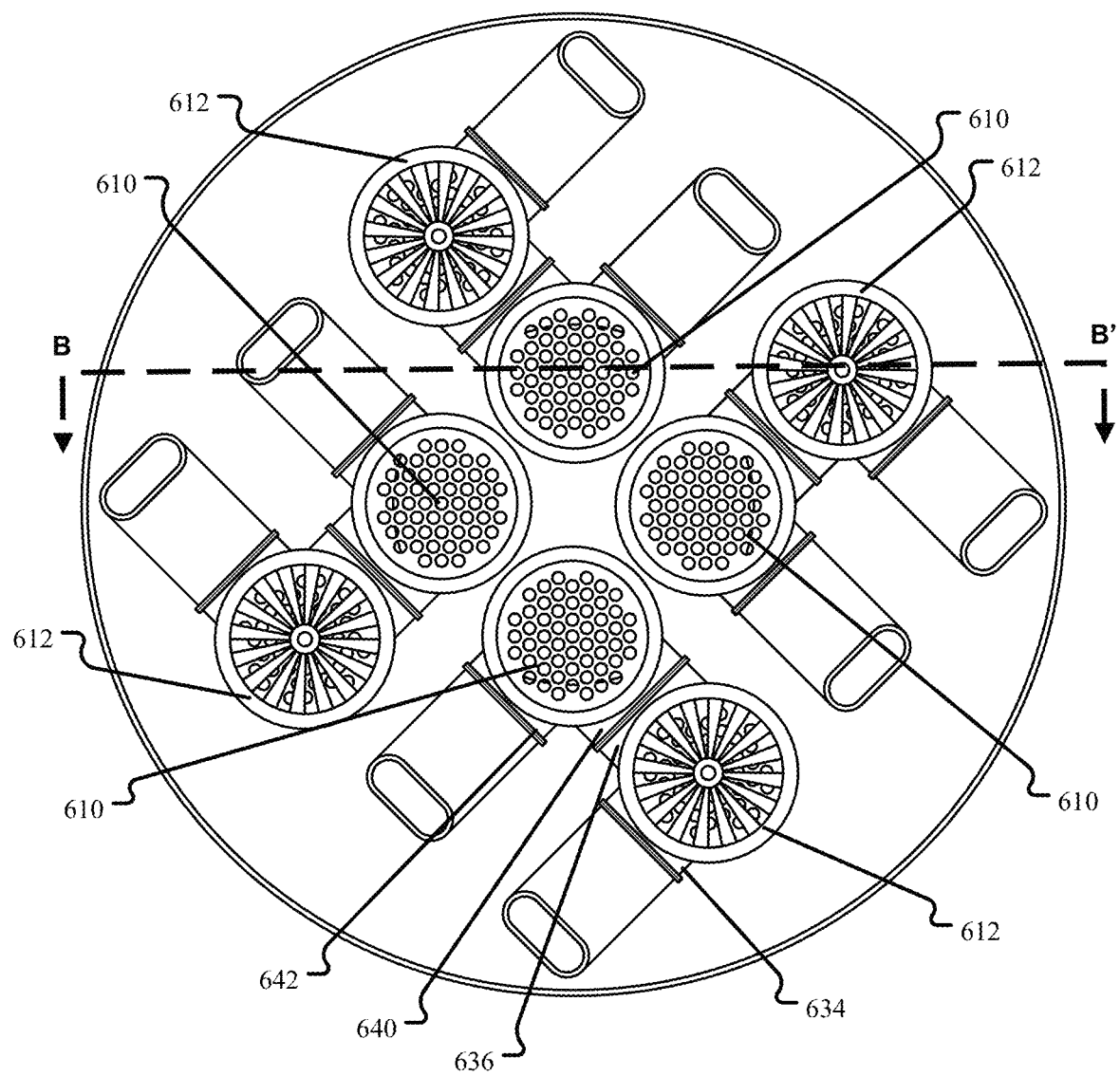

FIG. 6A is a vertical cross-section of the reactor 600 taken along the section B-B' identified in FIG. 6B and illustrates the fuel connections between first and second heat exchanger stages 610, 612. The cross-section is cut through one pair of first and second heat exchanger stages 610, 612 that are in the same fuel circuit to illustrate the connections and components in the fuel circuit. With regards to the fuel circuit, each first heat exchanger stage 610 is connected to the inlet of a second heat exchanger stage via a U-shaped pipe 611 containing an impeller 630. Again, flow of fuel salt through the fuel circuit is illustrated with dashed arrows.

FIG. 6B is a horizontal cross-section along section A-A' of FIG. 6A showing how the four primary and four second heat exchanger stages 610, 612 are arranged above the reactor core and illustrate the connections and components in the coolant circuit. FIG. 6B shows details regarding the locations of the coolant inlets and outlets. In particular, in the embodiment shown cold coolant is delivered to a coolant inlet 634 of each second heat exchanger stage 612. The coolant outlet 636 of the second heat exchanger stage is connected to a coolant inlet 640 of its associated first heat exchanger stage 610.

In the embodiment shown, coolant is removed from each first heat exchanger stage 610 via a first heat exchanger stage coolant outlet 642. In an alternative embodiment, fuel salt may distributed by a manifold to multiple second heat exchanger stages 612, which allows a vertically-segmented reactor to have a different number of first heat exchanger stages 610 than second heat exchanger stages 612.

Figure 6C:
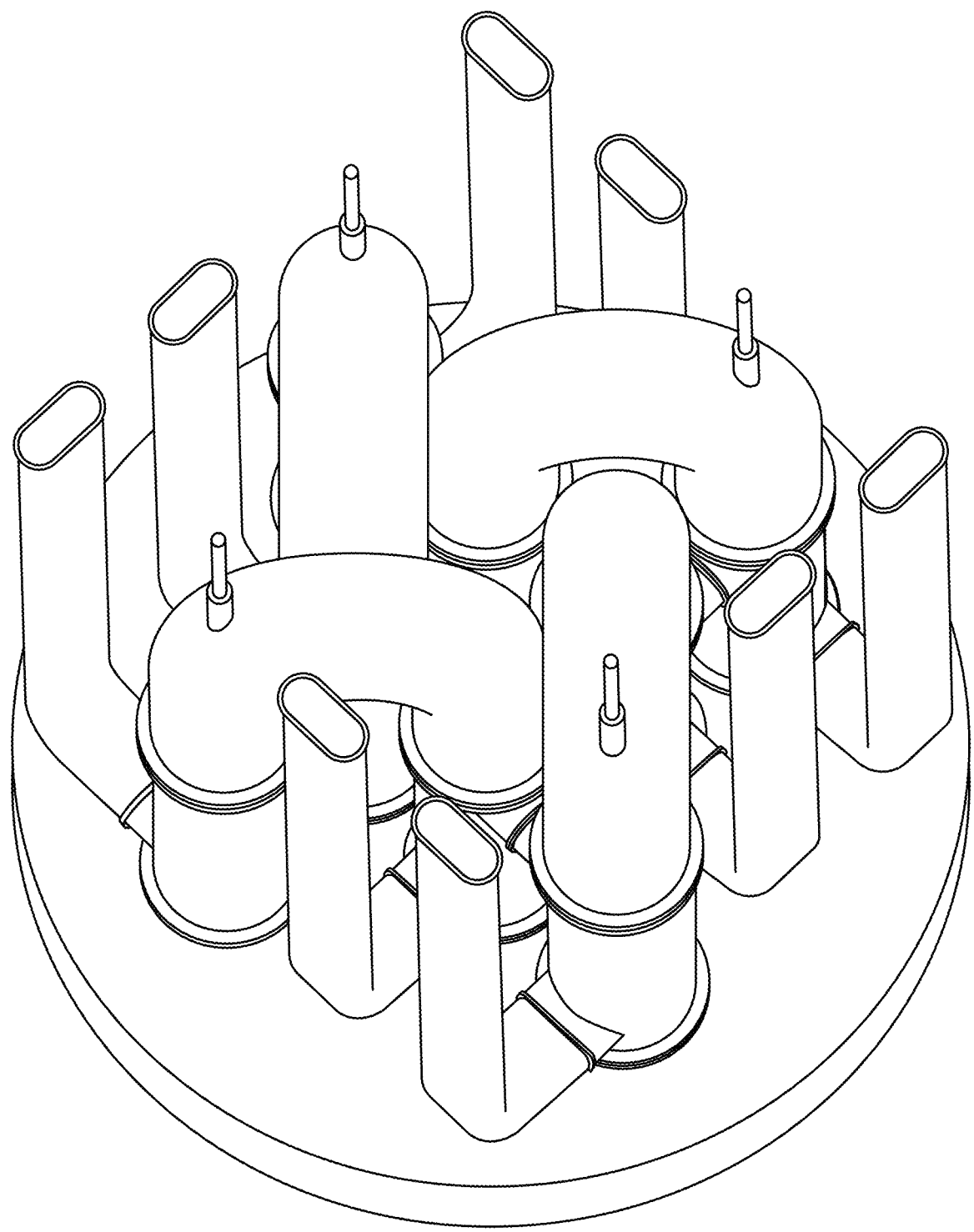

FIG. 6C is a perspective view of the components located above the shield further illustrating the arrangement of the four sets of first and second heat exchanger stages. In the embodiment shown, each heat exchanger is the same size which improves the ease of repair and servicing.

Figure 6D:
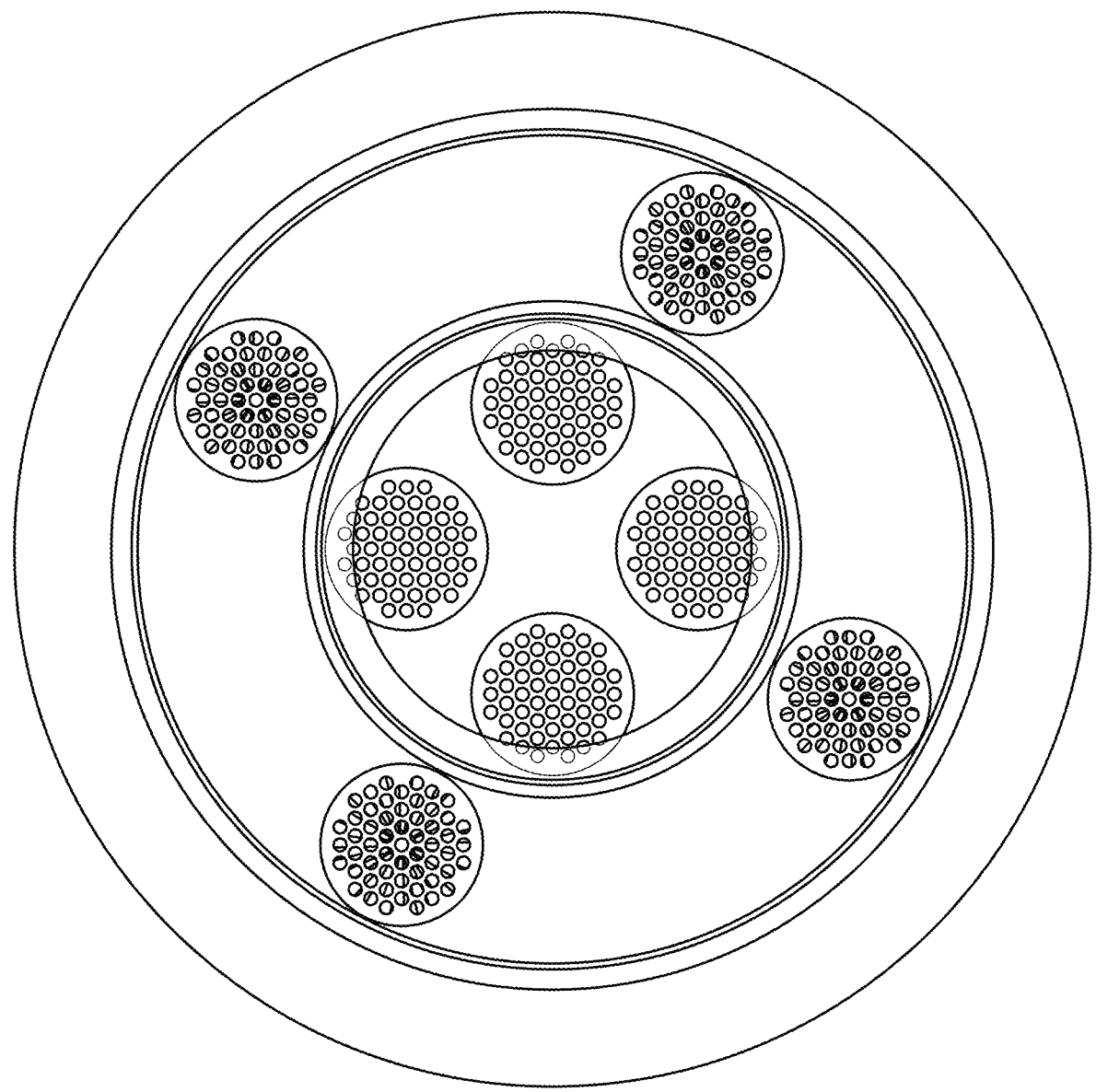

FIG. 6D is a partially transparent plan view of the vertically-segmented reactor that shows the locations of the first heat exchanger stages 610 and second heat exchanger stages 612 relative to the baffle 632 and the side wall of the reactor core 602.

Figure 7:
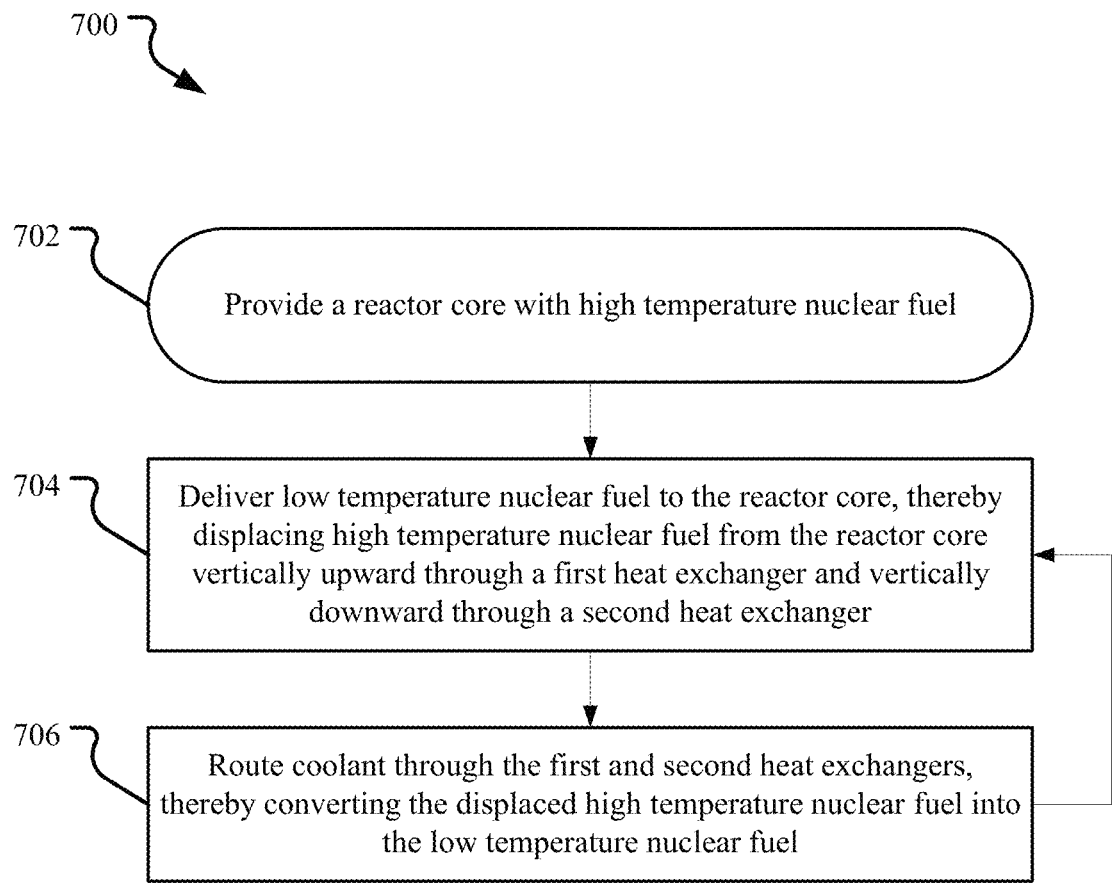
FIG. 7 is a simplified flow diagram of the cooling process as performed by the vertically-segmented nuclear reactor.

FIG. 7 is a simplified flow diagram of the cooling process as performed by the vertically-segmented reactor. The method starts with a setup operation 702. The setup operation 702 may or may not include building an embodiment of a vertically-segmented reactor, as described above, but does include providing at least a reactor core containing molten nuclear fuel. As described above, the neutronics of the reactor core cause a nuclear reaction in the nuclear fuel that causes the nuclear fuel to increase in temperature. By the nature of the reaction, the temperature will not be evenly distributed throughout the core with the nuclear fuel in the center of reactor core becoming hotter than the fuel at the bottom or periphery of the reactor core.

The high temperature nuclear fuel is then displaced from the reactor core by delivering lower temperature nuclear fuel to the reactor core in a displacement operation 704. In an embodiment, the temperature difference between the high temperature nuclear fuel and the lower temperature nuclear fuel is from 100 to 1000° C., depending on the fuel salt. The greater the temperature difference, the better from a heat transfer perspective. However, certain fuel salts may be very corrosive or otherwise require very expensive equipment to handle at high or very high temperatures. Additionally, the lower temperature is limited by the melting point of the type of nuclear fuel chosen. For example, in one embodiment, the nuclear fuel is 71 mol % $UCl_4$-17 mol % $UCl_3$-12 mol % NaCl and the temperature difference is from 200 to 400° C., with a temperature difference of 250-350° C. being desired for a particular reactor configuration.

In an embodiment, the displacement operation 704 is an ongoing operation that maintains a continuous flow of nuclear fuel around the fuel circuit of a vertically-segmented reactor described above. However, during initial reactor start up the displacement operation 704 may include initiating the circulation. In an embodiment in which the fuel circuit is first filled with nuclear fuel, the circulation may be self-initiating by the creation of a natural circulation cell as a result of the temperature in the reactor core increasing relative to the nuclear fuel in the rest of the fuel circuit, upon removal of control rods, for example. As mentioned above, higher temperature molten nuclear fuel is less dense than low temperature nuclear fuel. This density difference creates a buoyancy force that naturally drives the higher temperature nuclear fuel upward at the center of the reactor core and into the first heat exchanger stage, thus initiating natural circulation.

In an alternative embodiment, the displacement may be actively initiated through the use of one or more impellers as provided in some of the reactor embodiments prior to removal of the control rods. In this embodiment, upon establishment of circulation in the fuel circuit and criticality in the reactor core, the impellers may be disengaged, stopped, or allowed to freewheel in favor of allowing natural circulation within the fuel circuit.

The method 700 further includes a cooling operation 706 in which coolant is routed through the coolant circuit of the heat exchangers to remove heat from the displaced nuclear fuel. The term 'routed' is used as the flow of coolant may be either actively maintained via pumping or passively maintained via natural circulation. In an embodiment, while in steady state operation the flow of coolant through the coolant circuit may also be driven primarily or completely by natural circulation due to the heating of the coolant as it passes through the coolant circuit. While FIG. 7 illustrates the cooling method 700 during steady state operation, depending on the embodiment, the cooling operation 706 may be initiated before, concurrently or after initiation of the displacement operation 704.

In an embodiment, the temperature of the coolant delivered to the heat exchangers is at or below that of the low temperature nuclear fuel. In an embodiment, coolant is routed in a coolant circuit first through the second heat exchanger stage(s) and then through the first heat exchanger stage(s) as described above. Alternatively, each heat exchanger may be a separate independent coolant circuit.

Regardless of the coolant circuit configuration, as part of the cooling operation 706 the temperature of the coolant delivered to the coolant circuit may be actively controlled to achieve a target operational parameter. For example, the temperature of the coolant delivered to the reactor could be controlled to maintain a target steady state reactor core temperature, a target heat removal rate, a target temperature for the low temperature nuclear fuel, and/or based on any other operational parameter of the reactor.

The method 700 may further include neutronically shielding the first and second heat exchangers from neutrons generated in the reactor core. As described above this may be achieved passively by providing a neutron shield between the reactor core and the heat exchangers.

Figure 8:
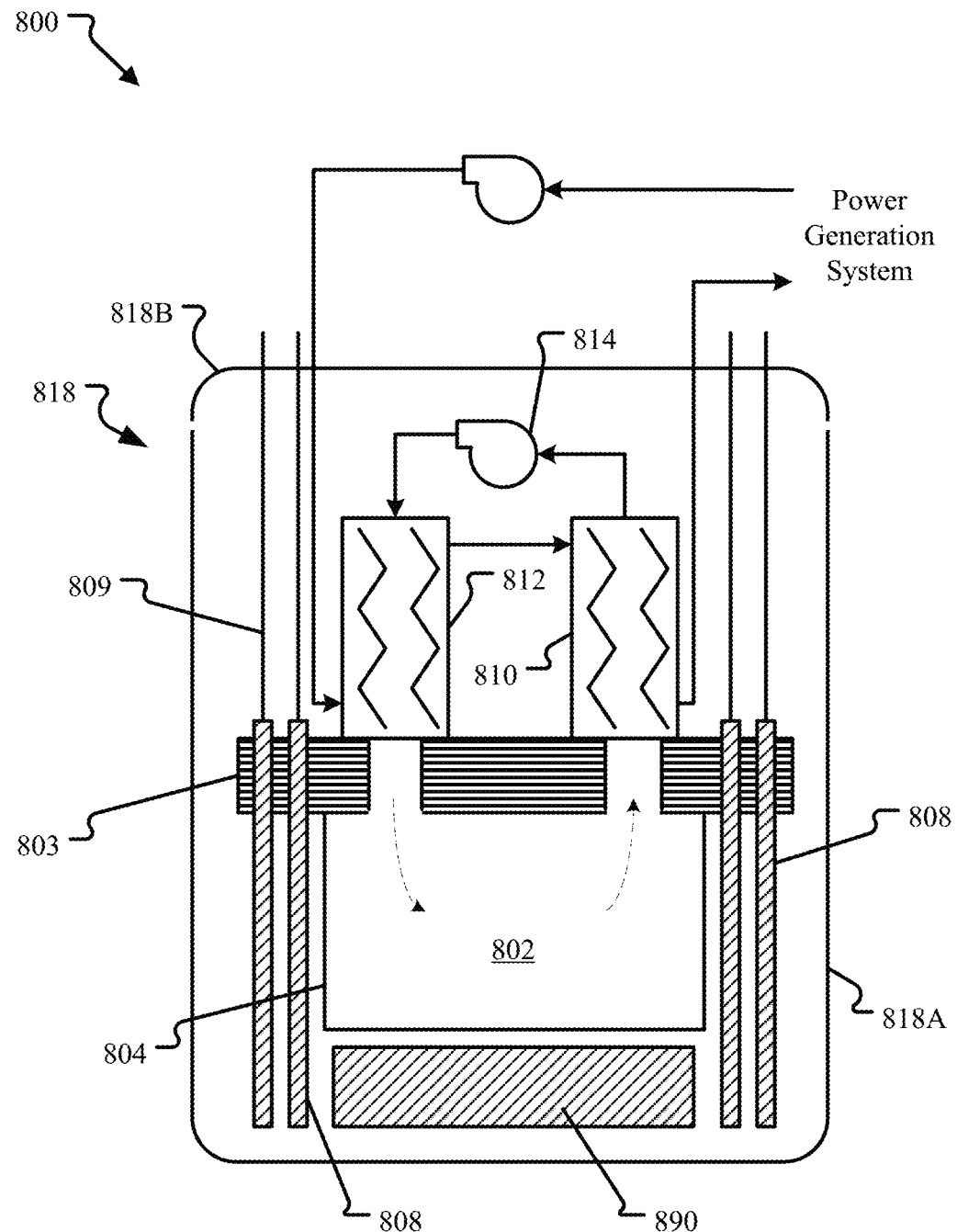
FIG. 8 illustrates an embodiment of a reflector configuration that may be used in a vertically-segmented nuclear reactor similar to that of FIG. 1.

FIG. 8 illustrates an embodiment of a reflector configuration that may be used in a vertically-segmented reactor similar to that of FIG. 1. In the embodiment shown, individual reflectors in the form of structural tubes 808 filled with reflector material, which may be solid or liquid at operating temperatures, are provided. The reflector tubes 808 may be located within the lower vessel portion 818A of the containment vessel but outside of the reactor core vessel 804 (as illustrated) or inside the reactor core vessel (e.g., in contact with the nuclear fuel) or both. For example, in the embodiment illustrated the reflector tubes 808 are provided in two concentric rings around the sides of the reactor core vessel 804. A shield 803 is provided to protect the heat exchangers 810, 812, pump 814 and other components above the core 802 within the containment vessel 818 from neutron damage. An additional reflector 890, which may or may not be in the form of a tube, may also be provided below the reactor core 802 as shown.

The number and arrangement of the reflector tubes 808 are selected to provide the desired amount of reflection back into the core of neutrons that would otherwise be lost to the core 802. In an embodiment, the tubes 808 may be collected and formed into a tube bundle. In an alternative embodiment, each tube may be independent and unconnected to the other tubes in the reactor, allowing individual tubes to be replaced easily.

One or more of the tubes 808 may be movable in order to dynamically alter the neutron flux in the core 802. In the embodiment shown, the reflector tubes are provided with a connecting rod 809 that allows the tubes to be raised and lowered from above. The connecting rods 809 also allow the reflecting tubes 808 to be easily inspected and replaced, if necessary, by lifting them out of the top portion 818B of the containment vessel 818. The capability to remove a reflector tube from the reactor further allows flexibility in operation as a removed reflector tube may be replaced with a control rod or an instrument for obtaining information from the reactor core 802. In an alternative embodiment, one or more of the tubes in the reflector tube bundle may be dedicated to use as an instrument-containing tube or control rod.

The reflector tubes 808 in this configuration may be held within a structural framework (not shown) to maintain proper alignment or may simply be hanging from the connecting rods. A structural framework could be a block of solid material provided with passages for reflector tubes or could be an open, lattice structure.

Figure 9:
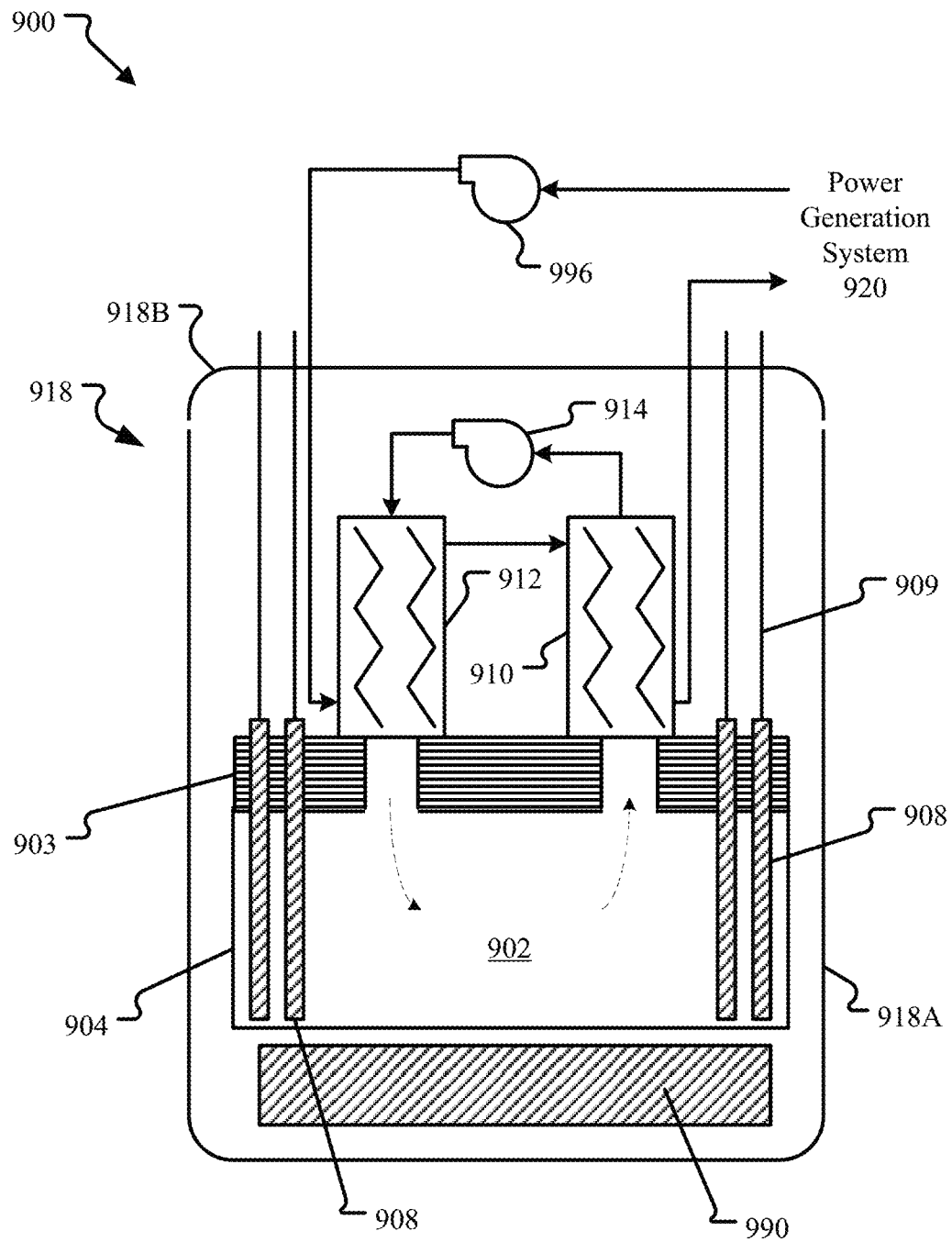
FIG. 9 illustrates an embodiment of yet another reactor that uses reflector tubes within the reactor core vessel.

FIG. 9 illustrates an embodiment of yet another reactor that uses reflector tubes within the reactor core vessel. This configuration has the benefit of reducing neutron damage to the reactor core vessel 904 by reflecting at least some neutrons before they reach the vessel 904. Otherwise, this embodiment is similar to that of FIG. 8 in that the reflector tubes 908 are provided with a connecting rod 909 that allows the tubes to be raised and lowered from above.

In the embodiment shown, space is provided around the reflector tubes to allow fuel salt to circulate between the tubes 908. It may be desirable to maintain the reflector tubes 908 at a lower temperature and flow of the low temperature fuel salt entering the reactor core from the second heat exchanger stage may be partially or completely directed through or around the reflector tubes 908 to maintain them at a lower temperature than that of the central core during operation.

Again, a framework (not shown) may be provided to hold the tubes 908 in position and may also have flow channels for directing the low temperature fuel salt flow around the tubes.

Figure 10:
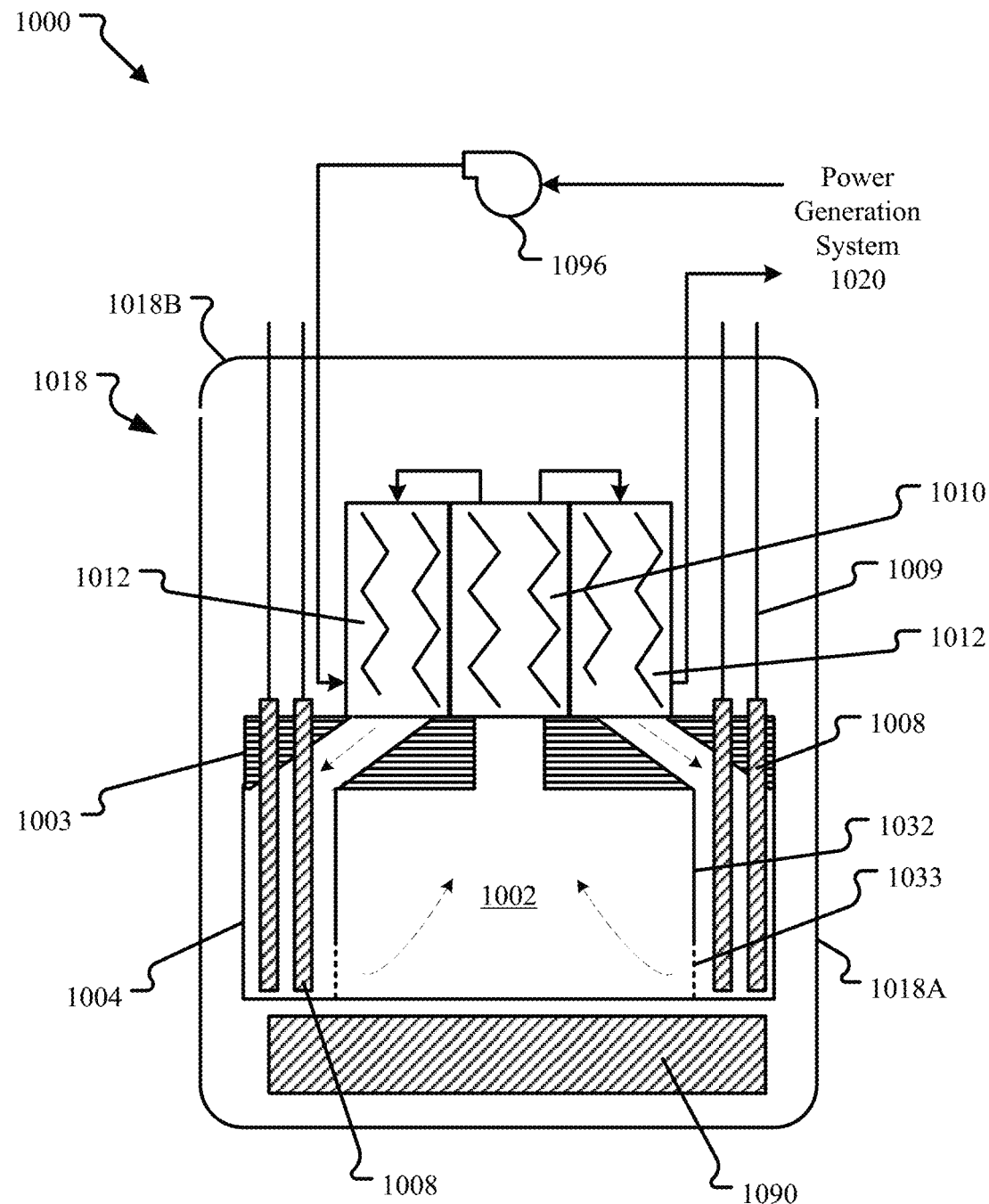
FIGS. 10 and 16 illustrate additional embodiments of a framework and configuration of reflector tubes in a vertically-segmented nuclear reactor that provides for a more active cooling of the reflector tubes by directing the flow of the cold fuel salt exiting the second heat exchanger stages through the reflector tube bundle before it enters the center of the reactor core.

FIG. 10 illustrates yet another embodiment of a framework and configuration of reflector tubes in a vertically-segmented reactor that prevents stagnation of the fuel salt within the reflector tubes and provides more active cooling of the reflector tubes by directing the flow of the cold fuel salt exiting the second heat exchanger stages through the reflector tube bundle before it enters the center of the reactor core. In the reactor 1000, fuel salt from the reactor core 1002 flows upward through a first heat exchanger stage 1010 and then is routed to peripheral second heat exchanger stages 1012 where the fuel flows downward back into the reactor vessel 1004. As with FIG. 9, the reactor 1000 includes reflector tubes 1008 at the periphery of the reactor core 1002 within the reactor vessel 1004. However, the reactor 1000 is provided with one or more baffles 1032 that direct the flow of the cooled fuel salt past the reflector tubes before the fuel salt flows into the central region of the reactor core 1002. In the embodiment shown, the baffles 1032 form a solid wall between the reflector tubes 1008 and the central region of the reactor core 1002, with the exception of a perforated zone 1033 near the bottom of the vessel 1004. This directs the flow of the cold fuel salt as illustrated by the dashed flow arrows and ensures that the reflector tubes 1008 remain at a temperature close to that of the cold fuel salt exiting the second heat exchanger stages 1012.

Figure 16:
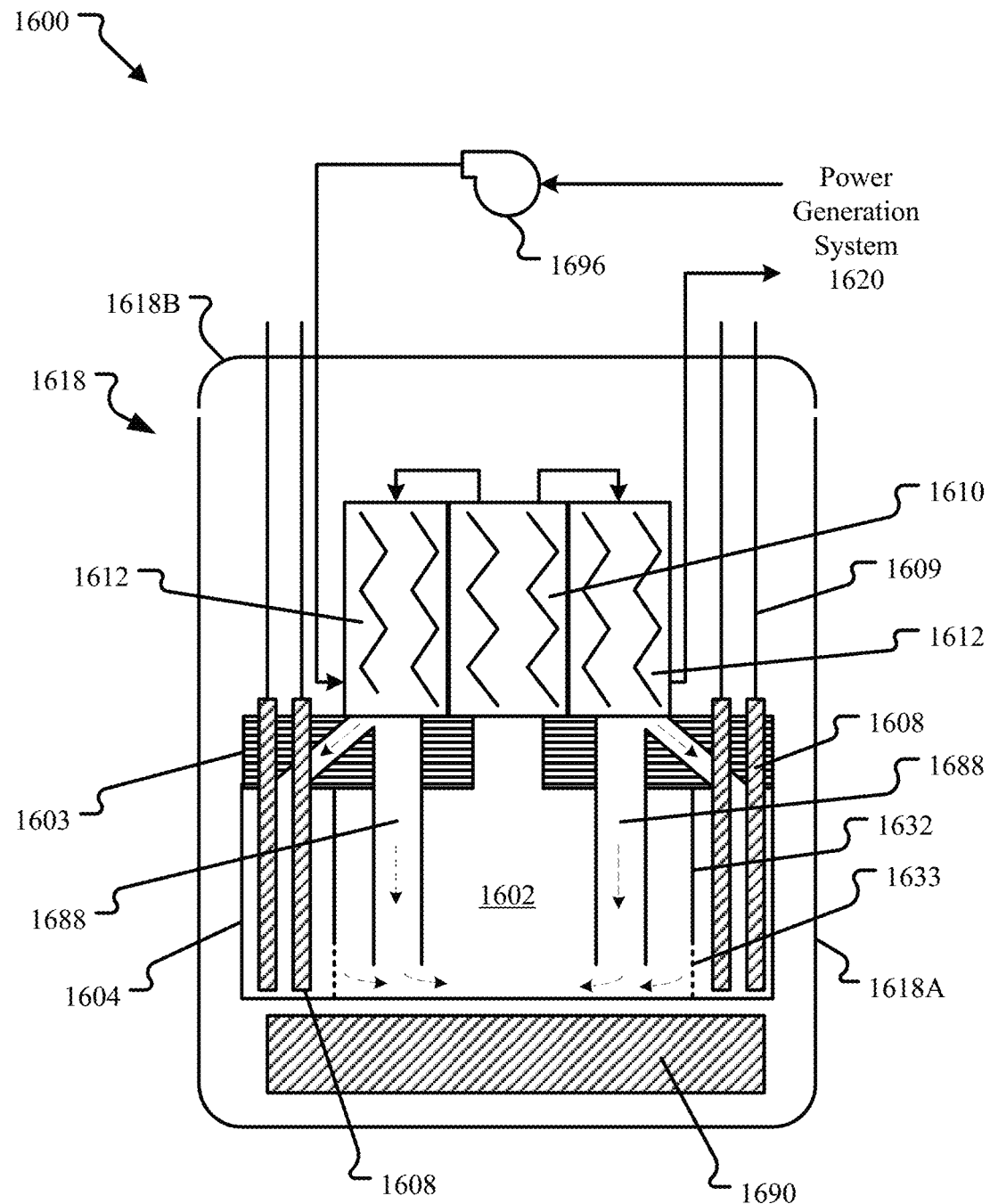

While other configurations are also possible including FIG. 16, FIG. 10 illustrates that the cooled fuel salt can be used to actively cool the reflector and, indeed, any components located in the reactor core 1002 or near a surface of the reactor vessel. For example, in yet another embodiment, the baffle 1032 could be in a U shape that further forces the cooled fuel salt to flow along the bottom of the reactor vessel 1004 before entering the central region of the reactor core 1002 through a perforated zone at the center of the U. This configuration would keep the lateral reflector tubes as well as the bottom reflector 1090 cool during operation.

FIG. 16 illustrates an alternative embodiment of a vertically-segmented reactor that provides for a more active cooling of the reflector tubes, in this case by diverting a portion of the flow of the cold fuel salt exiting the second heat exchanger stages through the reflector tube bundle before it enters the center of the reactor core 1602 while the balance of the flow is directed into the reactor core. In the reactor 1600, fuel salt from the reactor core 1602 flows upward through a first heat exchanger stage 1610 and then is routed to peripheral second heat exchanger stages 1612 where the fuel flows downward back into the reactor vessel 1604. As with FIGS. 9 and 10, the reactor 1600 includes reflector tubes 1608 at the periphery of the reactor core 1602 within the reactor vessel 1604. Flow from the second heat exchanger stages 1612 is split, for example as it passes through the shield 1603 as shown, so that a portion of the flow is directed to the reflector tubes 1608 and the balance flows into the center of the reactor core 1602. As in FIG. 10, the reactor 1600 is provided with one or more baffles 1632 that directs the flow of cooled fuel salt past the reflector tubes before that portion of the fuel salt flows into the central region of the reactor core 1602. In the embodiment shown, the baffles 1632 form a solid wall between the reflector tubes 1608 and the central region of the reactor core 1602, with the exception of a perforated zone 1633 near the bottom of the vessel 1604. This configuration directs the flow of the cold fuel salt as illustrated by the dashed flow arrows. In an embodiment, the amount of flow split between the reflector tubes 1608 and that directly entering the central region of the reactor core 1602 is controlled by the design of the shield. In an embodiment, 10-30%, e.g., 20%, of the flow may be diverted past the reflector tubes with the balance delivered to the central region of the reactor core 1602. In an alternative embodiment, the flow diversion may be adjustable and actively controlled by moveable valves, baffles, or other flow diversion equipment provided in the fuel circuit, such as in the shield 1603 or at the bottom of the second heat exchanger stage 1612.

FIG. 16 also illustrates the use of a downcomer 1688, or dip tube, to deliver the cooled fuel salt into the bottom of the reactor core 1602 as shown. This may assist with creating a strong natural circulation cell in the fuel circuit and may also prevent hot spots or areas of low circulation from being created in the reactor core 1602.

Figure 11:
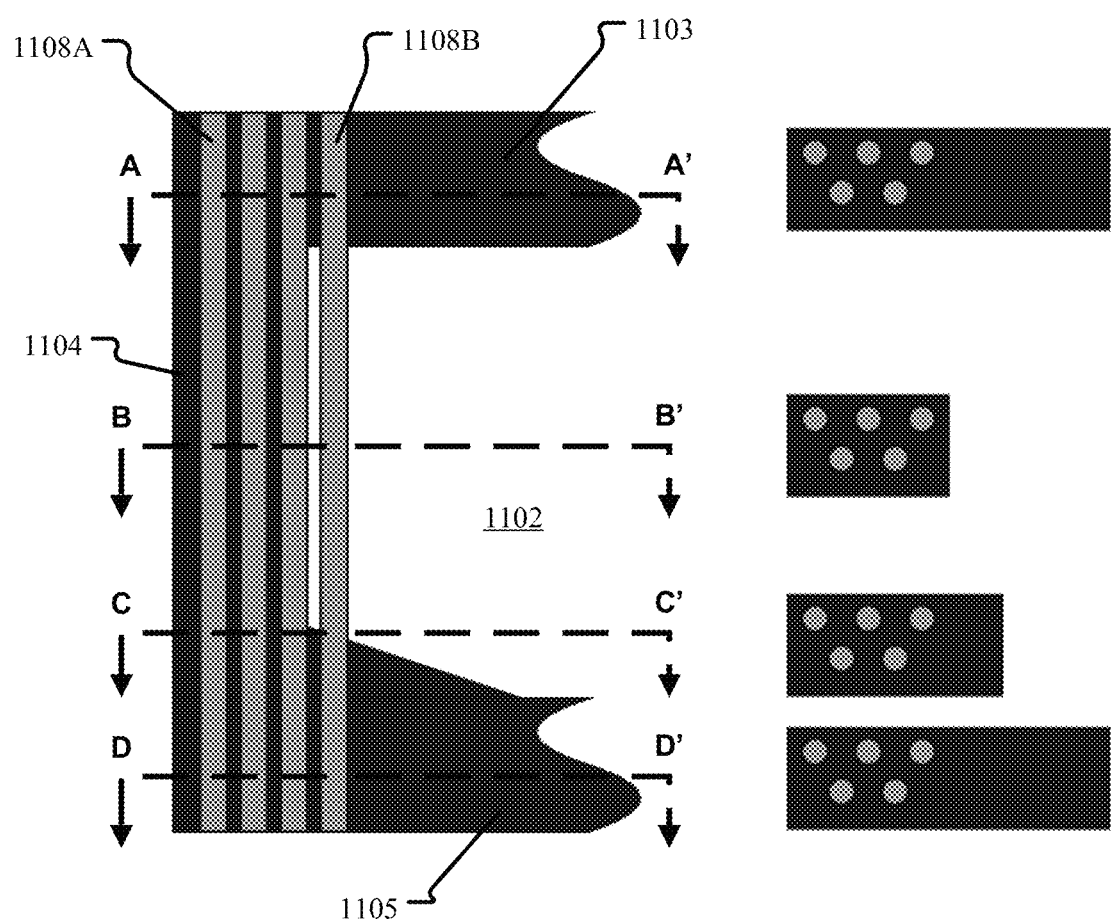
FIG. 11 illustrates an embodiment of a framework and configuration of reflector tubes in a vertically-segmented nuclear reactor.

FIG. 11 illustrates an embodiment of a framework and configuration of reflector tubes in a vertically-segmented reactor. FIG. 11 illustrates a vertical cross-section of a portion of the reactor core vessel sidewall 1104, the reactor core vessel floor 1105, and a shield 1103. Section lines A-A', B-B', C-C' and D-D' are indicated on the cross-section and, right of the section lines, a horizontal cross-section is shown associated with each section line to indicate the relative arrangement of the reflector tubes at that point in the reactor.

In the embodiment shown, some reflector tubes 1108A are contained completely within the reactor core vessel sidewall 1104. Other reflector tubes 1108B are exposed to the fuel salt in the reactor core 1102. In the embodiment shown, the reflector tubes 1108A, 1108B also penetrate at least some distance into the reactor core vessel floor 1105. A ramp for directing fuel salt flow is provided as shown at section C-C'.

Reflector tubes of FIGS. 8-11 may be of any cross-sectional shape, such as for example circular (i.e., cylindrical tubes), hexagonal, octagonal, ellipsoidal, etc. In addition reflector tubes may have different external and internal profiles, such as for example a hexagonal exterior cross-section with a circular interior space for the reflector material. Tubes may be contoured for strength, for directing flow of fuel salt around the exterior or for positive engagement with a framework.

A Direct Reactor Auxiliary Cooling System (DRACS) independent of the power generating heat exchanger circuit is often used to enhance the safety of the reactor. The embodiments of the vertically-segmented reactor described above could be easily adapted to include additional DRACS heat exchangers in the fuel circuit, such as above the first and second heat exchanger stages. This addition would not require increasing the size of the reactor vessel or reactor core and, thus, the vertically-segmented reactor is well-suited for use with DRACS.

Figure 12:
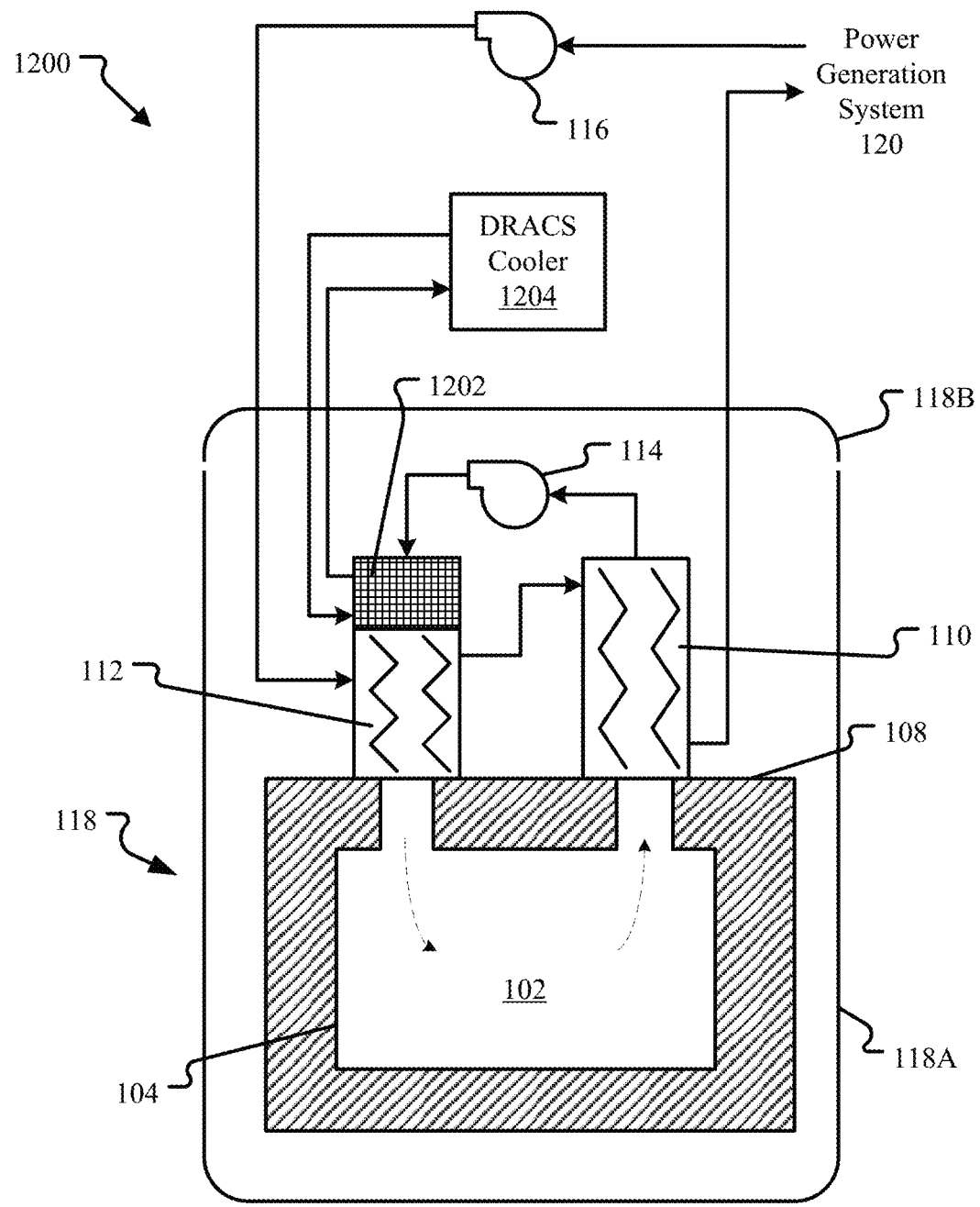
FIGS. 12-14 illustrate how several of the reactor embodiments described above could be adapted to use a Direct Reactor Auxiliary Cooling System (DRACS) independent of the power generating coolant circuit.
Figure 13:
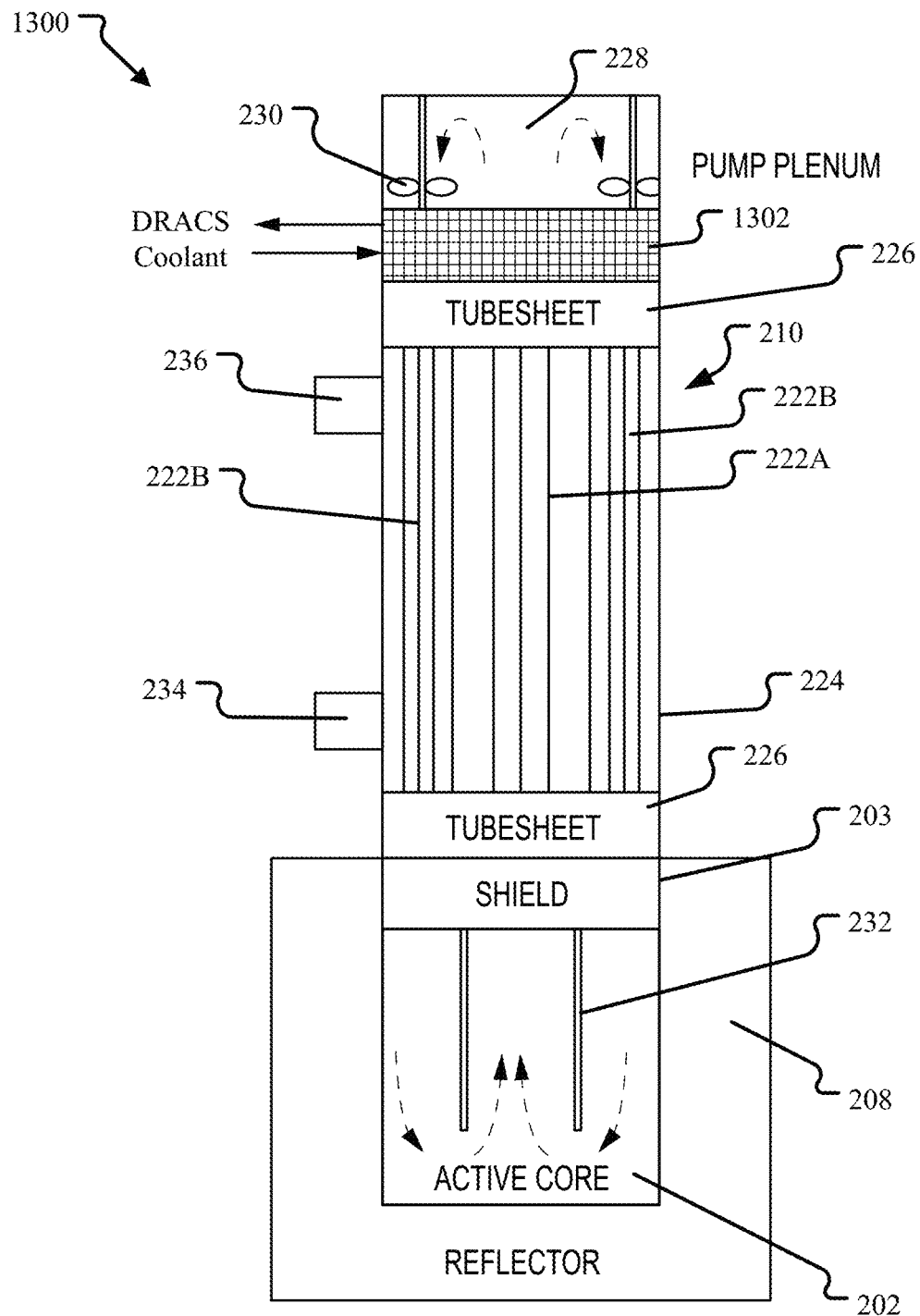
Figure 14:
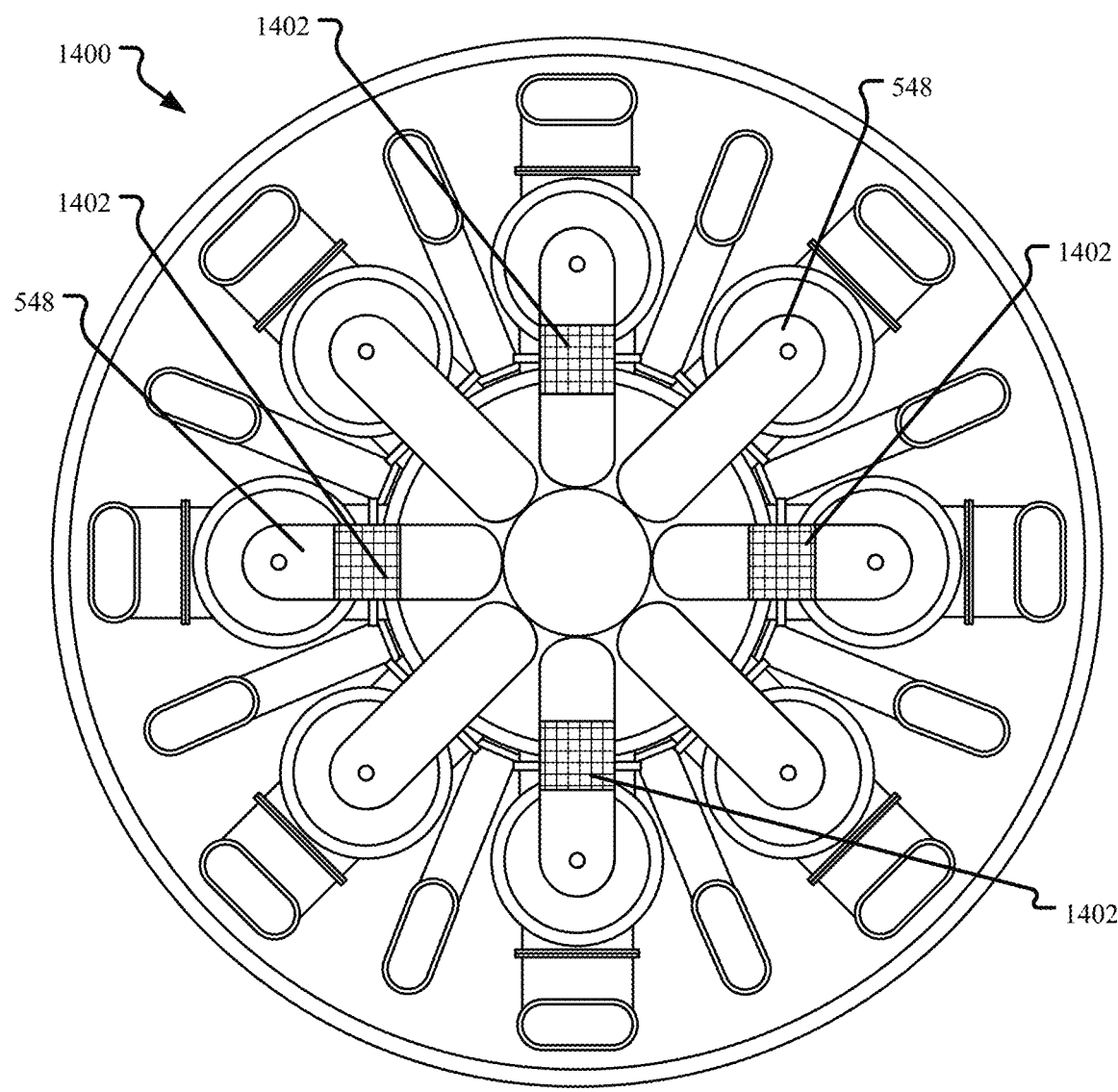

FIGS. 12-14 illustrate how several of the reactor embodiments described above could be adapted to use a DRACS. As an independent heat exchanger circuit, one or more DRACS heat exchangers 1202 could be located anywhere in the fuel circuit of a vertically-segmented reactor. FIG. 12 illustrates a reactor 1200 similar to that illustrated in FIG. 1, in which the DRACS heat exchanger is located at the top of the second heat exchanger stage 112. A separate DRACS cooler 1204 and coolant circuit is provided that brings coolant into the DRACS heat exchanger 1102 and returns it to the cooler 1204. Alternative embodiments include locating the DRACS heat exchanger 1202 at the bottom of the second heat exchanger stage 112, above the first heat exchanger stage 110, between the first and second heat exchanger stages, or below the first heat exchanger stage 110. However, it may be beneficial in creating strong natural circulation to locate the DRACS heat exchanger as far above the center of the reactor core 102 as possible.

FIG. 13 illustrates how a DRACS could be integrated into a vertically-segmented reactor as shown in FIG. 2. In this embodiment, a DRACS heat exchanger 1302 is placed between the integrated heat exchanger assembly 210 and the pump plenum 228 of the reactor 1300. In an alternative embodiment, the DRACS heat exchanger could be between the bottom of the integrated heat exchanger assembly 210 and the plenum 228. In yet another embodiment the DRACS heat exchanger 1302 could be integrated into the integrated heat exchanger assembly 210 by using the same heat exchanger tubes 222A, 222B of the integrated heat exchanger, but isolating that portion in the shell so that an independent DRACS coolant in used in that portion.

FIG. 14 illustrates how a DRACS could be integrated into a vertically-segmented reactor as shown in FIGS. 5A-D. In this embodiment, a DRACS heat exchanger 1402 is placed in each of four of the U-shaped pipes 548 in the reactor 1400. In an alternative embodiment, fewer or more of the U-shaped connecting pipes may be provided with a DRACS heat exchanger 1402 to achieve the desired amount of cooling.

FIGS. 12-14 illustrate the flexibility of the vertically-segmented reactor for locating DRACS heat exchangers in the fuel circuit.

Figure 15:
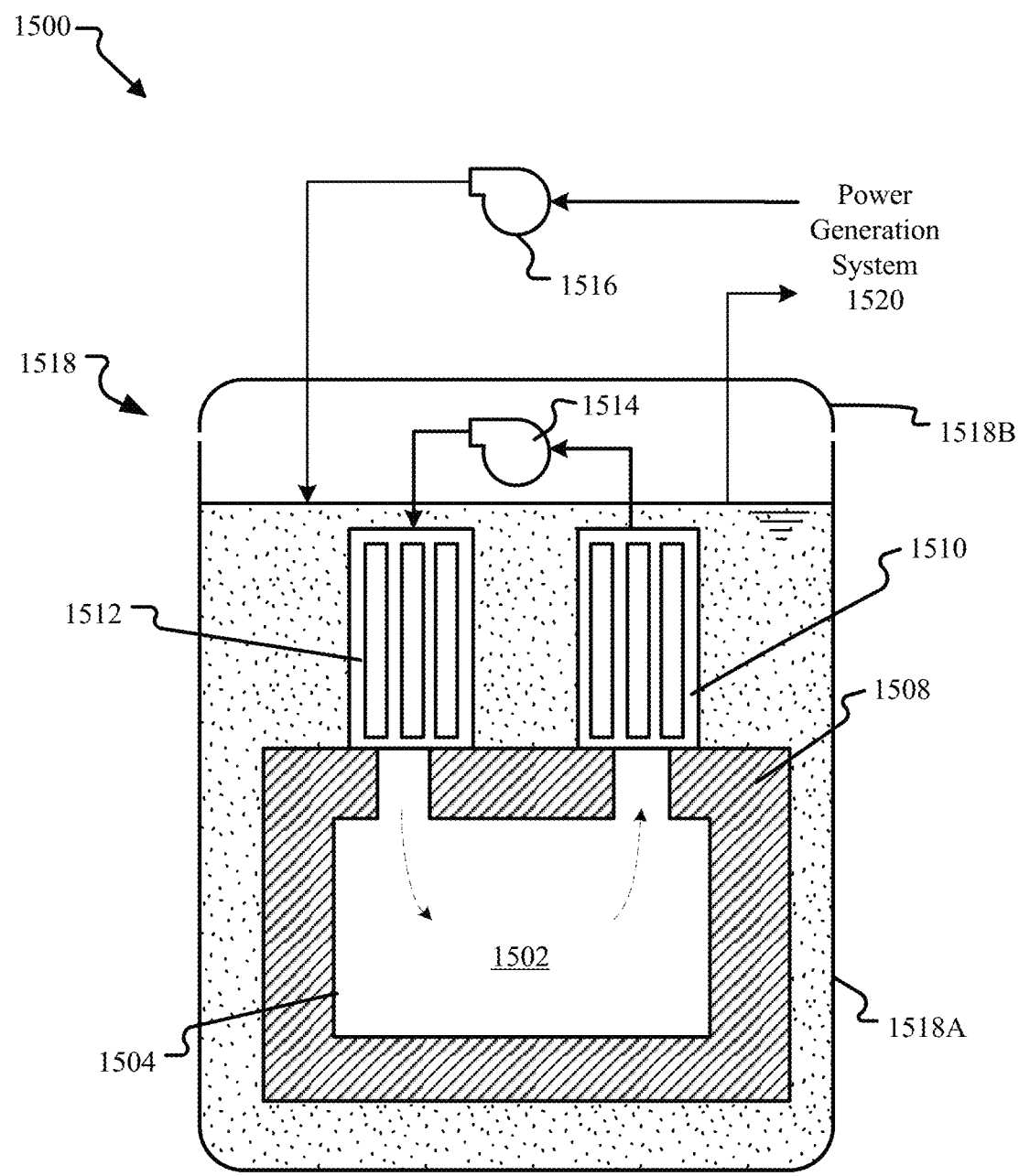
FIG. 15 illustrates how a vertically-segmented nuclear reactor may be adapted for use with a coolant pool.

FIG. 15 illustrates how a vertically-segmented reactor may be adapted for use with a coolant pool. In the reactor 1500 shown, the containment vessel 1518 is filled with coolant to form a pool within which the reflector 1508, reactor vessel 1504, first heat exchanger stage 1510 and second heat exchanger stage 1512 are submerged. In the pool embodiment, the first heat exchanger stage 1510 and second heat exchanger stage 1512, instead of being shell-and-tube heat exchangers, take the form of tube bundles, essentially a shell-and-tube exchanger with the shell removed. Thus, the coolant is free to flow between the tubes of the first heat exchanger stage 1510 and second heat exchanger stage 1512 to provide cooling to the fuel salt within the tubes. Fuel salt may be actively flowed using a pump 1514 that may or may not be below the level of the coolant in the pool, or the flow may be driven by natural circulation. Likewise, the coolant may be actively circulated within the pool, such as by driving the coolant flow from the second heat exchanger stage 1512 toward the tubes of the first heat exchanger stage 1510 before coolant is removed. Coolant flow may be directed by the injection point of the coolant, baffles, and/or impellers located at points within the pool to obtain the desired flow profile around the submerged components. This configuration allows the coolant to further provide cooling to the reflector 1508 at the sides and the bottom of the reactor vessel 1504.

Notwithstanding the appended claims, the disclosure is also defined by the following clauses:

1. A molten fuel nuclear reactor comprising:
a reactor vessel defining a reactor core containing nuclear fuel;
a first heat exchanger above the reactor core that receives high temperature nuclear fuel from the reactor core;
a second heat exchanger above the reactor core that receives nuclear fuel from the first heat exchanger and delivers lower temperature nuclear fuel to the reactor core; and
a containment vessel surrounding the reactor vessel, the first heat exchanger, and the second heat exchanger.

2. The molten fuel nuclear reactor of clause 1 further comprising:
one or more impellers within the containment vessel that drive the flow of fuel through the reactor vessel, the first heat exchanger, and the second heat exchanger.

3. The molten fuel nuclear reactor of clause 1 or 2 further comprising:
a neutron shield separating the reactor core from the first and second heat exchangers.

4. The molten fuel nuclear reactor of any of the above clauses further comprising:
a reflector assembly surrounding at least a portion of the reactor vessel.

5. The molten fuel nuclear reactor of any of the above clauses further comprising:
a reflector assembly within the reactor vessel located within the nuclear fuel at a periphery of the reactor core.

6. The molten fuel nuclear reactor of any of the above clauses further comprising:
one or more baffles affecting nuclear fuel flow in at least one of the reactor core, the first heat exchanger, and the second heat exchanger.

7. The molten fuel nuclear reactor of any of the above clauses further comprising:
a plenum between a nuclear fuel outlet of the first heat exchanger and a nuclear fuel inlet of the second heat exchanger.

8. The molten fuel nuclear reactor of any of the above clauses, wherein during operation natural circulation drives the flow of nuclear fuel through the reactor vessel, the first heat exchanger, and the second heat exchanger, the natural circulation created by a temperature difference between high temperature fuel in the reactor core and the lower temperature fuel exiting the second heat exchanger.

9. The molten fuel nuclear reactor of any of the above clauses, wherein the nuclear fuel in the reactor core is a salt of chloride, bromide, and/or fluoride.

10. The molten fuel nuclear reactor of any of the above clauses, wherein the nuclear fuel contains one or more of uranium, plutonium, or thorium.

11. The molten fuel nuclear reactor of any of the above clauses, wherein the first heat exchanger and the second heat exchanger are contained within a single shell.

12. The molten fuel nuclear reactor of any of the above clauses wherein the first heat exchanger is a single, shell-and-tube heat exchanger.

13. The molten fuel nuclear reactor of any of the above clauses, wherein one or both of the first heat exchanger and the second heat exchanger includes one or more individual, shell-and-tube heat exchangers.

14. A method for removing heat from a molten fuel nuclear reactor having a reactor core containing high temperature liquid nuclear fuel, the method comprising:
delivering low temperature nuclear fuel into the reactor core, thereby displacing some high temperature nuclear fuel from the reactor core upward through a first heat exchanger and downward through a second heat exchanger; and
routing coolant through the first and second heat exchangers, thereby transferring heat from the high temperature nuclear fuel to the coolant and converting the displaced high temperature nuclear fuel into the low temperature nuclear fuel.

15. The method of clause 14, wherein delivering the low temperature nuclear fuel into the reactor core includes passing the low temperature nuclear fuel from the second heat exchanger into the reactor core.

16. The method of clause 14 or 15, wherein delivering the low temperature nuclear fuel includes operating at least one impeller to drive flow of the nuclear fuel through the first and second heat exchangers.

17. The method of any of clauses 14-16 further comprising:
neutronically shielding the first and second heat exchangers from neutrons generated in the reactor core.

18. The method of any of clauses 14-17, wherein routing the coolant includes delivering coolant at a temperature less than that of the high temperature nuclear fuel to the second heat exchanger.

19. The method of any of clauses 14-18, wherein routing coolant includes pumping coolant first through the second heat exchanger and then through the first heat exchanger.

20. The method of any of clauses 14-19, wherein the first and second heat exchangers are vertically-oriented shell-and-tube heat exchangers located above the reactor core.

Notwithstanding that the numerical ranges and parameters setting forth the broad scope of the technology are approximations, the numerical values set forth in the specific examples are reported as precisely as possible. Any numerical values, however, inherently contain certain errors necessarily resulting from the standard deviation found in their respective testing measurements.

It will be clear that the systems and methods described herein are well adapted to attain the ends and advantages mentioned as well as those inherent therein. Those skilled in the art will recognize that the methods and systems within this specification may be implemented in many manners and as such are not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. For example, in any of the embodiments shown, the positions of the first heat exchanger stages and second heat exchanger stages may be reversed so that cooled fuel salt enters the reactor directly above the center of reactor core and hot fuel salt is removed at the periphery of the reactor core. Such a modification only requires reversing the direction of flow in the fuel circuit.

As another example, when adapted for use in thermal reactors the embodiments of the vertically-segmented reactor may include one or more moderators to thermalize the neutrons in the reactor core. Such moderators may be located in the reactor core and may be components made with or including graphite, water, beryllium, or beryllium oxide. Numerous other changes may be made which will readily suggest themselves to those skilled in the art and which are encompassed in the spirit of the disclosure.

What is claimed is:

1. A method for removing heat from a molten fuel nuclear reactor having a reactor core containing high temperature liquid nuclear fuel, the method comprising:
delivering lower temperature nuclear fuel into the reactor core, thereby
displacing some high temperature nuclear fuel from the reactor core upward into a first heat exchanger and
displacing some nuclear fuel downward in a second heat exchanger,
wherein the first heat exchanger is arranged above and in fluid communication with the reactor core to receive nuclear fuel from the reactor core,
wherein the second heat exchanger is arranged above the reactor core and in fluid communication with both the first heat exchanger and the reactor core to receive nuclear fuel from the first heat exchanger and to deliver nuclear fuel to the reactor core,
wherein the first heat exchanger comprises a shell-and-tube heat exchanger and the second heat exchanger comprises a separate shell-and-tube heat exchanger; and
routing coolant through the first and second heat exchangers, thereby
transferring heat from the high temperature nuclear fuel to the coolant and
converting the displaced high temperature nuclear fuel into the lower temperature nuclear fuel.

2. The method of claim 1, wherein delivering the lower temperature nuclear fuel into the reactor core includes passing the lower temperature nuclear fuel from the second heat exchanger into the reactor core.

3. The method of claim 1, wherein delivering the lower temperature nuclear fuel includes operating at least one impeller to drive flow of the nuclear fuel through the first and second heat exchangers.

4. The method of claim 1 further comprising:
  neutronically shielding the first and second heat exchangers from neutrons generated in the reactor core.

5. The method of claim 1, wherein routing the coolant includes delivering coolant at a temperature less than that of the high temperature nuclear fuel to the second heat exchanger.

6. The method of claim 1, wherein routing coolant includes pumping coolant first through the second heat exchanger and then through the first heat exchanger.

7. The method of claim 1, wherein the first and second heat exchangers are vertically-oriented shell-and-tube heat exchangers located above the reactor core.

\* \* \* \* \*